(12) United States Patent
Herrmann et al.

(10) Patent No.: US 12,151,594 B2
(45) Date of Patent: Nov. 26, 2024

(54) VEHICLE HAVING AN ELECTRONIC DETECTION DEVICE FOR POSITIONING AN ADJUSTABLE INTERIOR OBJECT ON AN INTERIOR SURFACE IN THE VEHICLE

(71) Applicant: Brose Fahrzeugteile SE & Co. Kommanditgesellschaft, Coburg, Coburg (DE)

(72) Inventors: Christian Herrmann, Großheirath (DE); Matthias Gempel, Bamberg (DE); Volker Deinhard, Bamberg (DE); Eike Fröhlich, Bamberg (DE); Markus Bauernfeind, Coburg (DE); Manfred Stenzel, Bamberg (DE); Thomas Weingärtner, Lichteneiche (DE); Wolfgang Uebel, Weitramsdorf (DE)

(73) Assignee: Brose Fahrzeugteile SE & Co. Kommanditgesellschaft, Coburg (DE)

( * ) Notice: Subject to any disclaimer, the term of this patent is extended or adjusted under 35 U.S.C. 154(b) by 402 days.

(21) Appl. No.: 17/629,204

(22) PCT Filed: Jul. 17, 2020

(86) PCT No.: PCT/EP2020/070289
§ 371 (c)(1),
(2) Date: Jan. 21, 2022

(87) PCT Pub. No.: WO2021/013729
PCT Pub. Date: Jan. 28, 2021

(65) Prior Publication Data
US 2022/0274509 A1    Sep. 1, 2022

(30) Foreign Application Priority Data

Jul. 22, 2019    (DE) .................... 10 2019 210 835.0
Jul. 22, 2019    (DE) .................... 10 2019 210 837.7
(Continued)

(51) Int. Cl.
*B60N 2/04* (2006.01)
*B60N 2/015* (2006.01)
(Continued)

(52) U.S. Cl.
CPC ........... *B60N 2/04* (2013.01); *B60N 2/01516* (2013.01); *B60N 2/01591* (2013.01); *G06V 20/59* (2022.01); *B60N 2/0272* (2023.08)

(58) Field of Classification Search
CPC .. B60N 2/04; B60N 2/01516; B60N 2/01591; B60N 2/0272; B60N 2002/0055; G06V 20/59; B60R 21/01554
(Continued)

(56) References Cited

U.S. PATENT DOCUMENTS

| 5,348,373 A  | 9/1994 | Stiennon |
| 10,300,832 B1 | 5/2019 | Folks et al. |

(Continued)

FOREIGN PATENT DOCUMENTS

| CN | 107031551 A | 8/2017 |
| CN | 107791984 A | 3/2018 |

(Continued)

OTHER PUBLICATIONS

Chinese Office Action for CN 202080060647.7, Dated Apr. 4, 2023, English Translation attached to original, All together 19 pages.
(Continued)

*Primary Examiner* — Muhammad Shafi
(74) *Attorney, Agent, or Firm* — Dickinson Wright PLLC

(57) ABSTRACT

A vehicle provided with a vehicle interior including an interior surface and at least one interior object provided for
(Continued)

arrangement and fixation in the vehicle interior, an electronic detection device is provided, which is adapted to detect a position of the interior object on the interior surface. The at least one interior object includes at least one drive device for a non-mechanically guided displacement of the interior object on the interior surface of the vehicle, and the electronic detection device adapted to detect the reaching of a specified fixing position on the interior surface by the interior object.

28 Claims, 16 Drawing Sheets

(30) Foreign Application Priority Data

| | | | |
|---|---|---|---|
| Aug. 29, 2019 | (DE) | ...................... | 10 2019 213 012.7 |
| Aug. 30, 2019 | (DE) | ...................... | 10 2019 123 369.0 |
| Sep. 17, 2019 | (DE) | ...................... | 10 2019 214 152.8 |
| Mar. 11, 2020 | (DE) | ...................... | 10 2020 203 147.9 |

(51) Int. Cl.
*G06V 20/59* (2022.01)
*B60N 2/02* (2006.01)

(58) Field of Classification Search
USPC .......................................................... 701/49
See application file for complete search history.

(56) References Cited

U.S. PATENT DOCUMENTS

| | | | |
|---|---|---|---|
| 2007/0114846 A1 | 5/2007 | Pavlovic | |
| 2012/0273616 A1 | 11/2012 | Marechal | |
| 2013/0093234 A1 | 4/2013 | Jones et al. | |
| 2014/0358379 A1 | 12/2014 | Nakazawa et al. | |
| 2015/0033537 A1 | 2/2015 | Poillot et al. | |
| 2016/0186468 A1 | 6/2016 | Ilea | |
| 2017/0028876 A1* | 2/2017 | Yamada | B60N 2/0244 |
| 2017/0080826 A1* | 3/2017 | Bonk | B60N 2/06 |
| 2017/0210247 A1 | 7/2017 | Rao et al. | |
| 2018/0014988 A1* | 1/2018 | Diaz-Flores | A61G 5/023 |
| 2018/0059209 A1* | 3/2018 | Cuddihy | G01S 5/0284 |
| 2018/0313654 A1 | 11/2018 | Aiuchi et al. | |
| 2018/0370387 A1 | 12/2018 | De Rico Herrero et al. | |
| 2019/0001846 A1* | 1/2019 | Jackson | B60N 2/01508 |
| 2019/0023161 A1 | 1/2019 | Sullivan et al. | |
| 2019/0092479 A1 | 3/2019 | Gross | |
| 2020/0171982 A1 | 6/2020 | Dry et al. | |
| 2020/0324724 A1 | 10/2020 | Ewert | |

FOREIGN PATENT DOCUMENTS

| | | | |
|---|---|---|---|
| CN | 109204074 A | | 1/2019 |
| CN | 109219537 A | | 1/2019 |
| CN | 109311412 A | | 2/2019 |
| CN | 109606697 A | | 4/2019 |
| DE | 69501940 T2 | | 7/1998 |
| DE | 19738024 A1 | | 3/1999 |
| DE | 69328236 T2 | | 9/2000 |
| DE | 10026530 A1 | | 12/2001 |
| DE | 10207372 B4 | | 12/2005 |
| DE | 202005016333 U1 | | 1/2006 |
| DE | 102004046070 A1 | | 4/2006 |
| DE | 202005004528 U1 | | 7/2006 |
| DE | 202007005749 U1 | | 11/2007 |
| DE | 102009059126 A1 | | 7/2010 |
| DE | 102012205167 A1 | | 10/2012 |
| DE | 102013216549 B3 | | 8/2014 |
| DE | 102013218152 A1 | | 3/2015 |
| DE | 102013221610 A1 | | 4/2015 |
| DE | 102013221986 A1 | | 4/2015 |
| DE | 102014210608 A1 | | 12/2015 |
| DE | 102014217545 A1 | | 3/2016 |
| DE | 102016213444 A1 | | 1/2017 |
| DE | 102017202169 A1 | | 12/2017 |
| DE | 102016214448 | * | 2/2018 |
| DE | 102016214448 A1 | | 2/2018 |
| DE | 102017200005 A1 | | 7/2018 |
| DE | 102017210608 A1 | | 12/2018 |
| DE | 102018128282 A1 | | 5/2019 |
| DE | 102019201538 A1 | | 9/2019 |
| DE | 202019104511 U1 | | 11/2019 |
| EP | 3124319 A1 | | 2/2017 |
| EP | 3578441 A1 | | 12/2019 |
| FR | 2762813 A1 | | 11/1998 |
| FR | 2802252 A1 | | 6/2001 |
| FR | 2868741 A1 | | 10/2005 |
| WO | 2012089373 A1 | | 7/2012 |

OTHER PUBLICATIONS

Chinese Office Action for CN 202080059526.0, Dated Apr. 4, 2023, English Translation attached to original, All together 19 Pages.

* cited by examiner

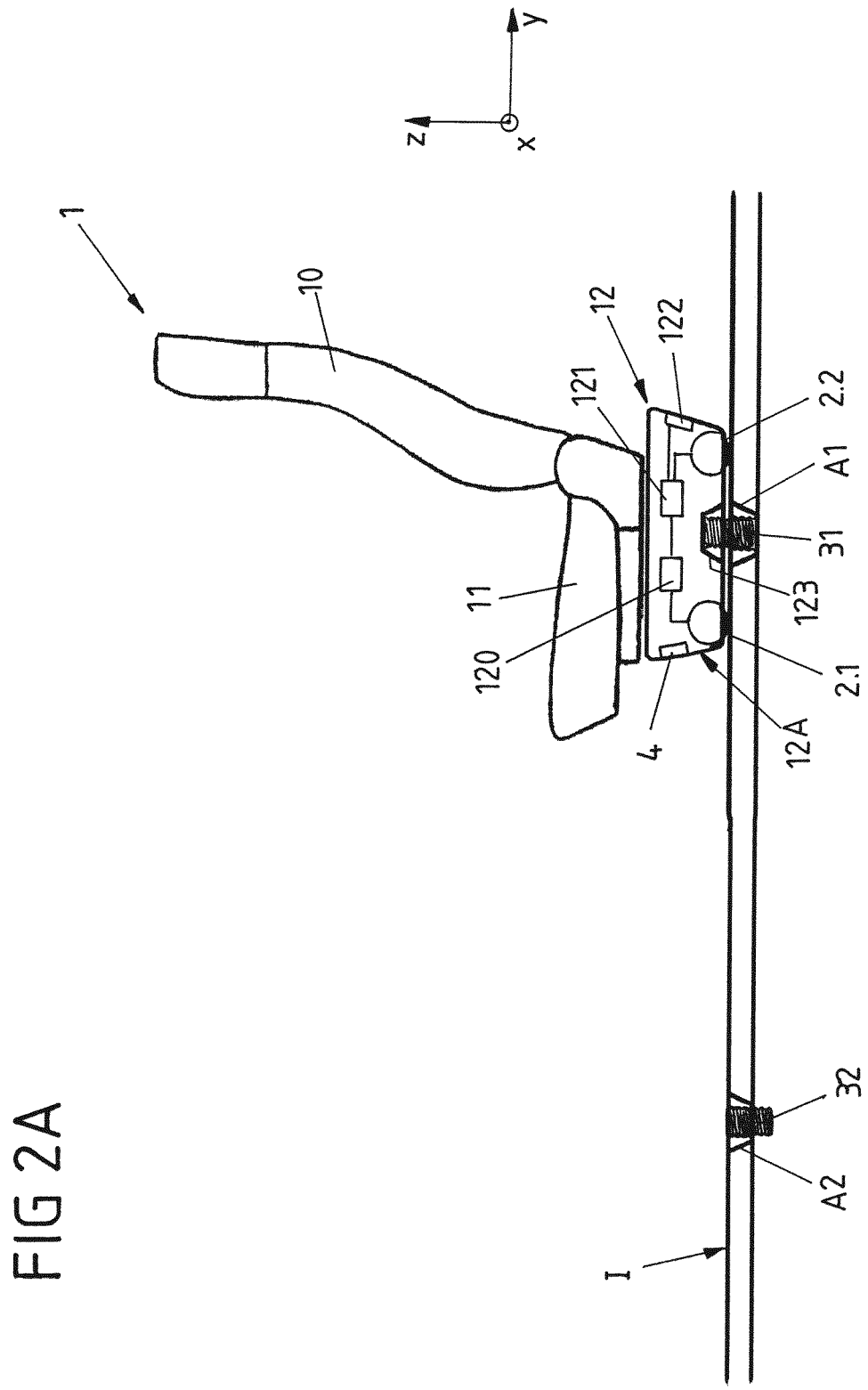

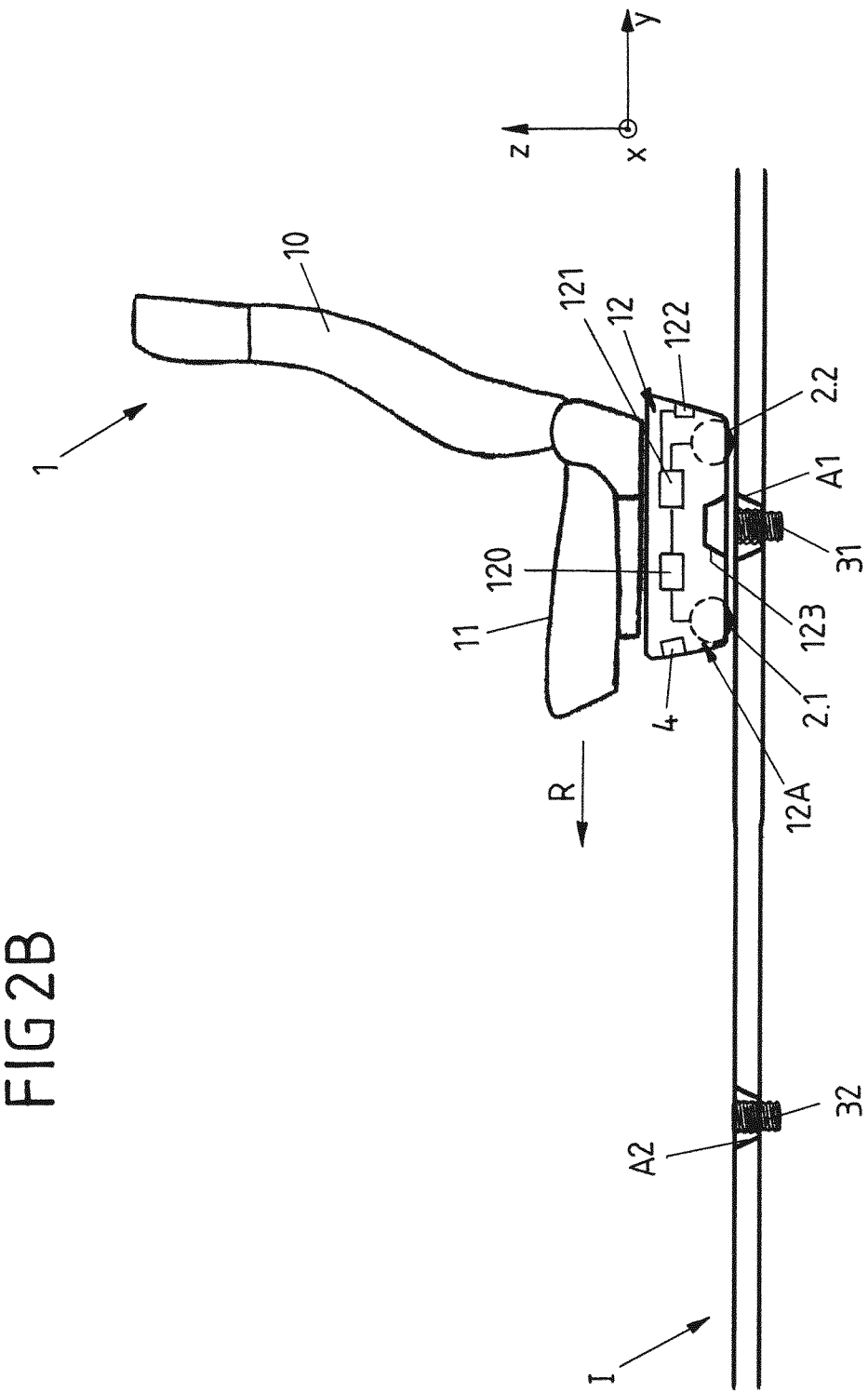

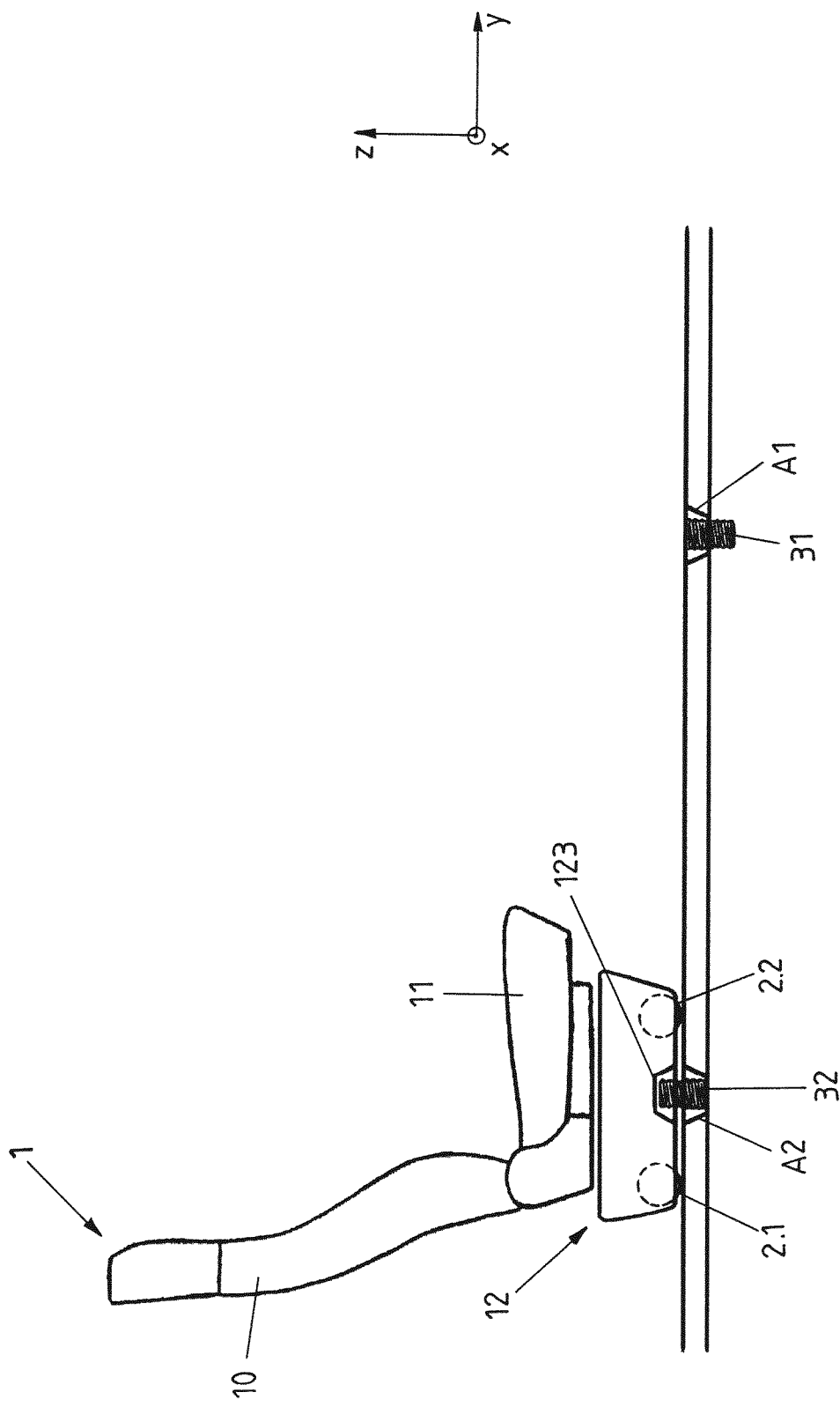

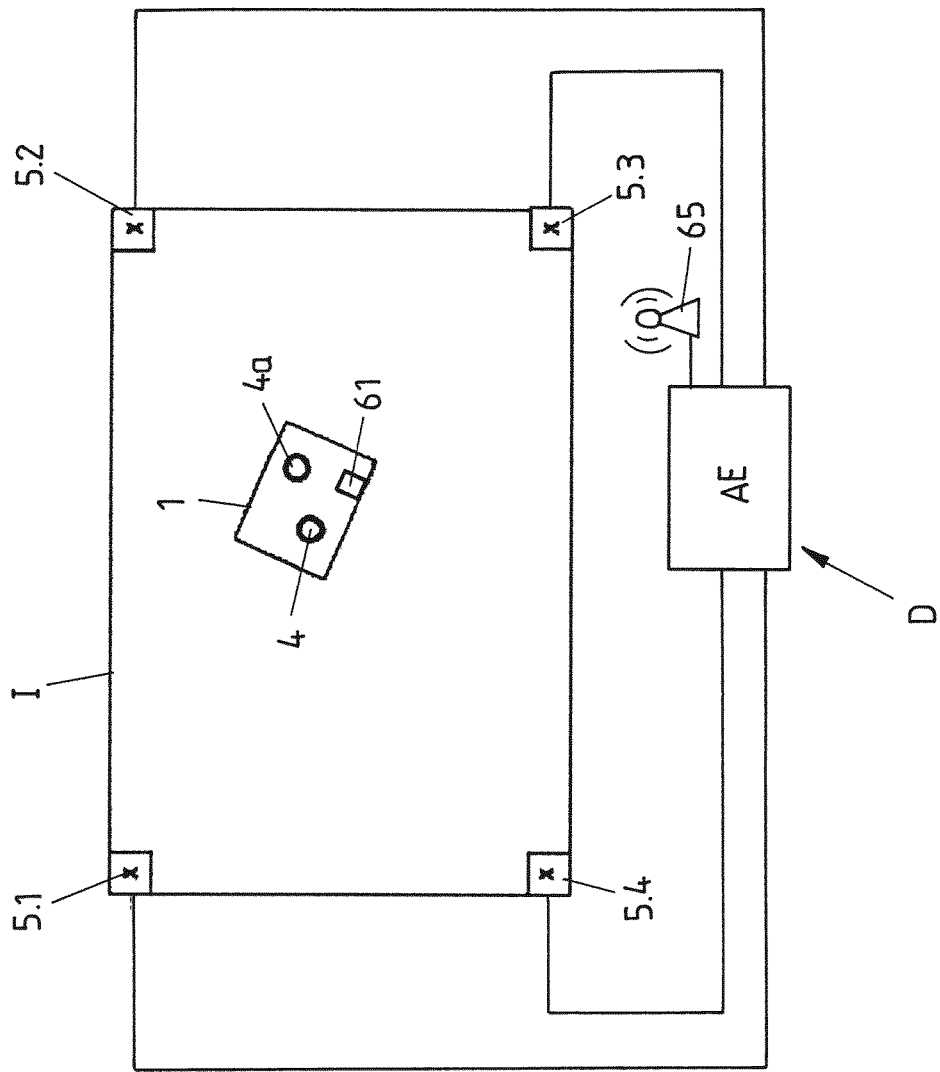

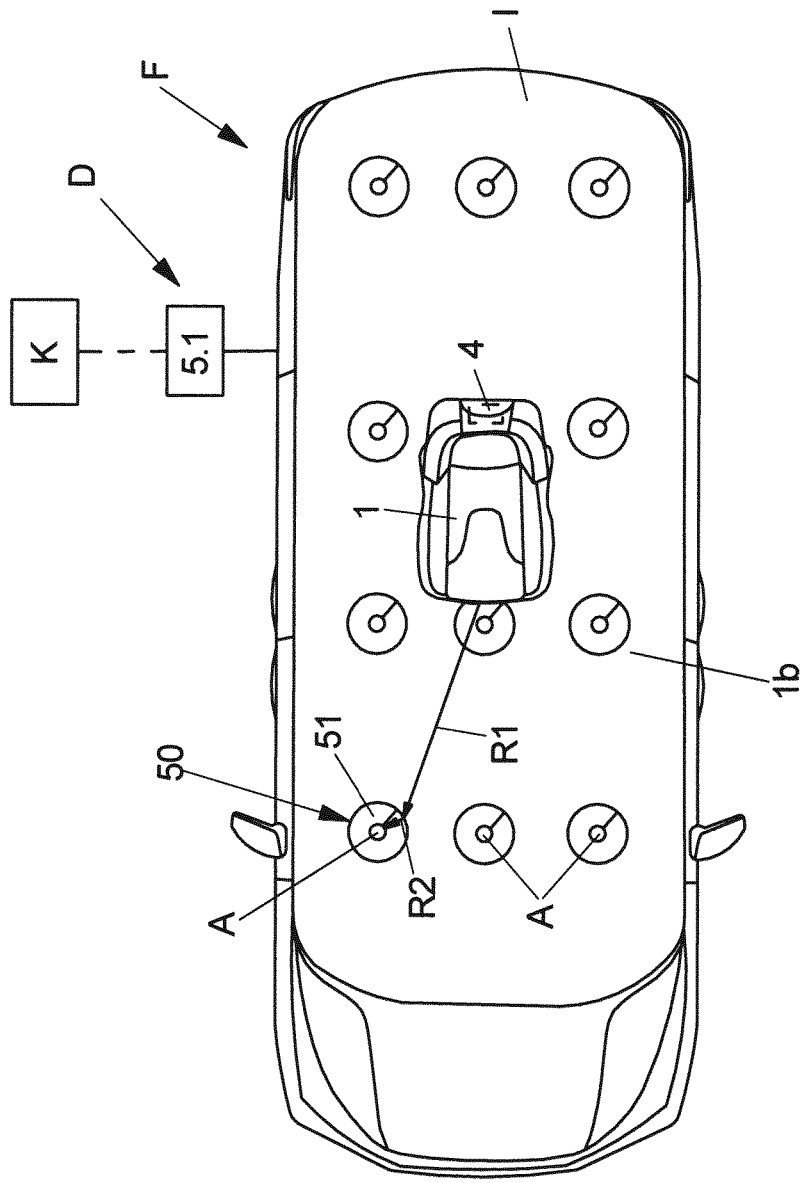

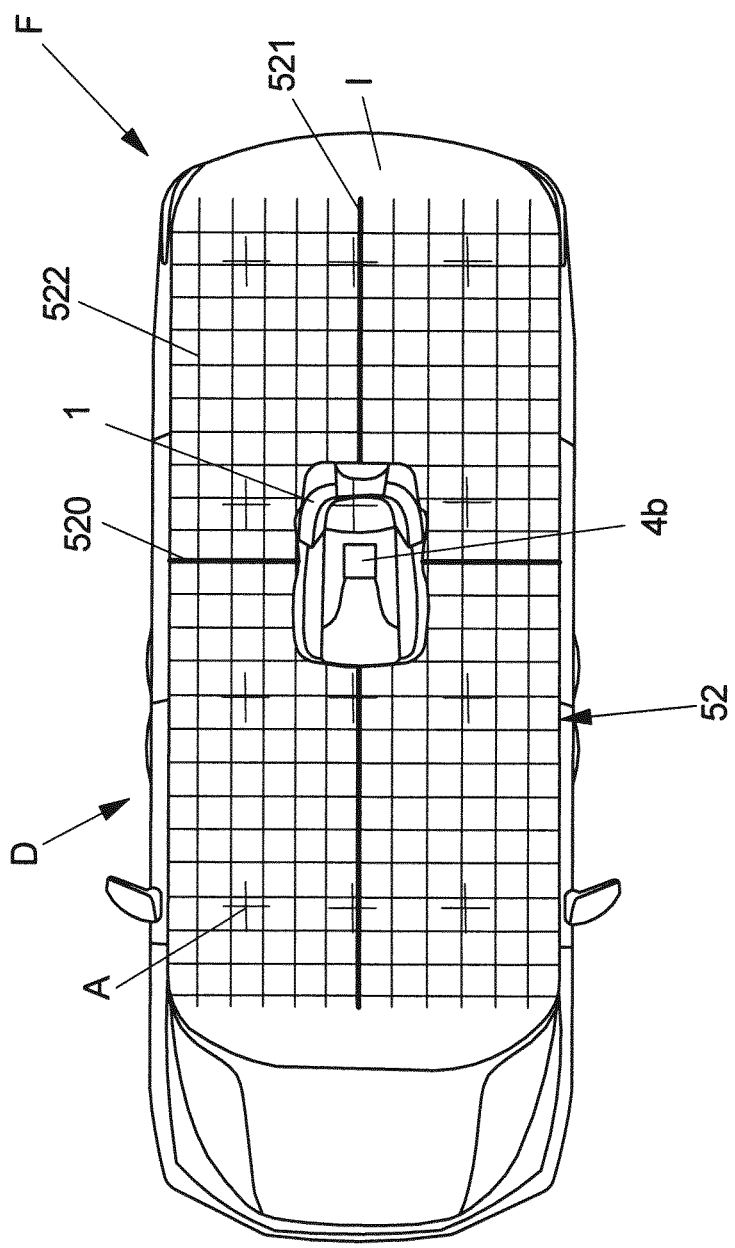

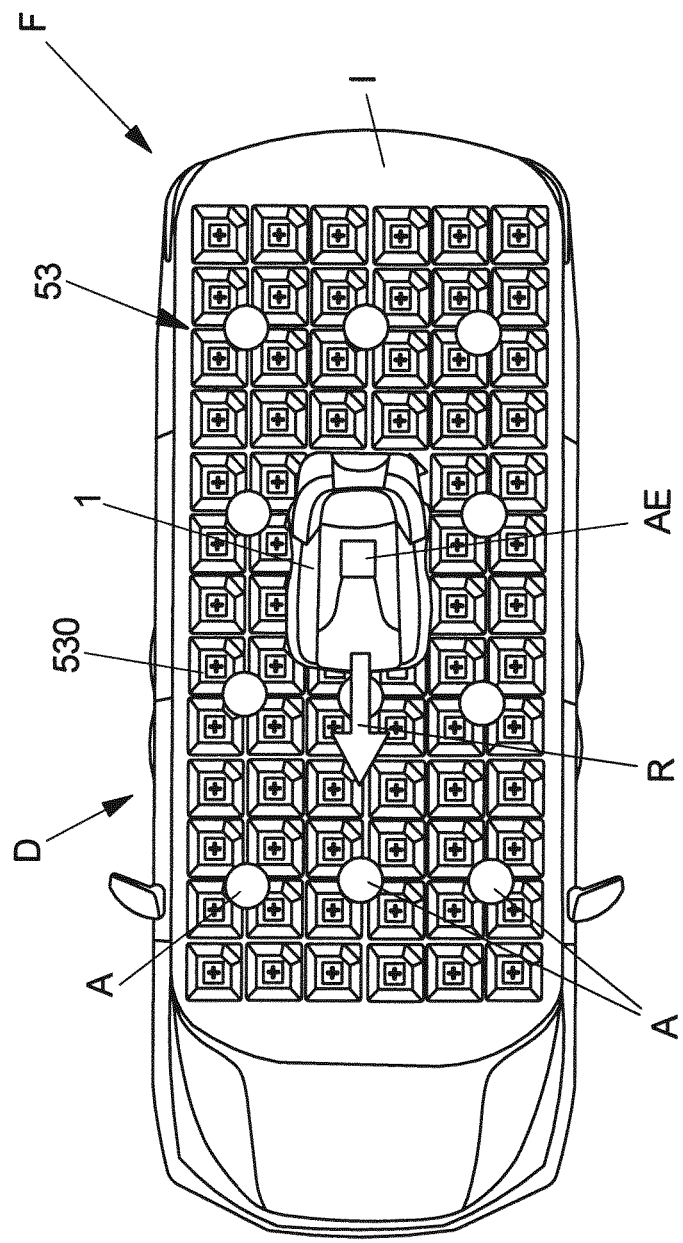

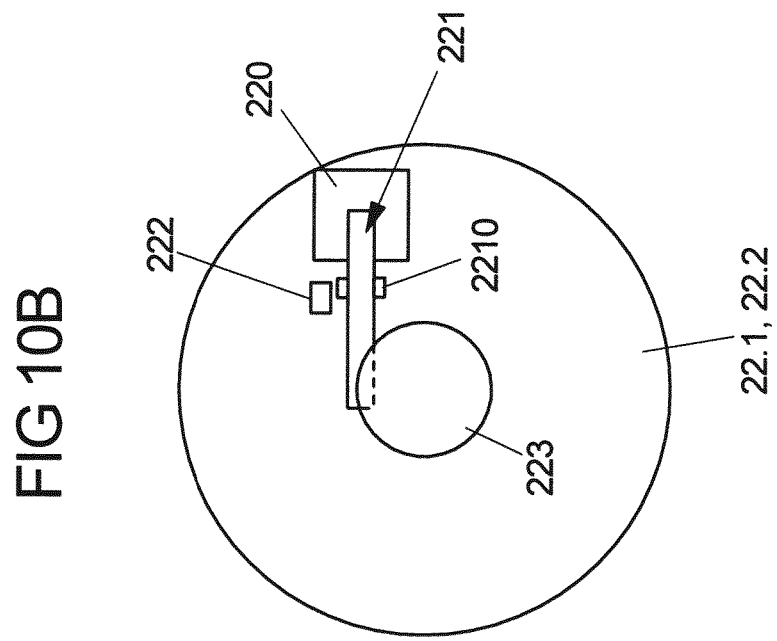
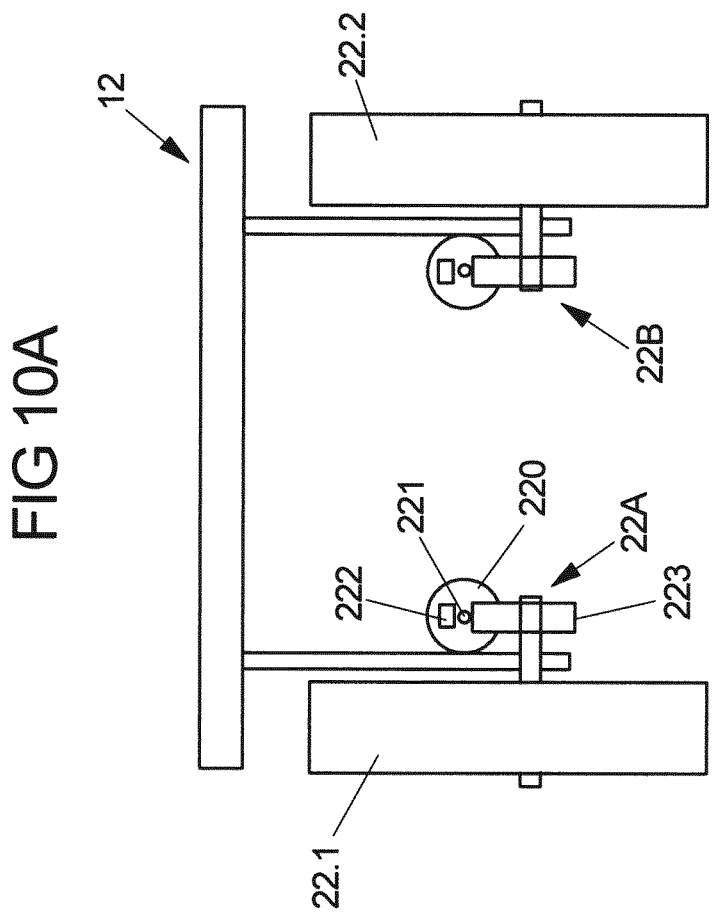

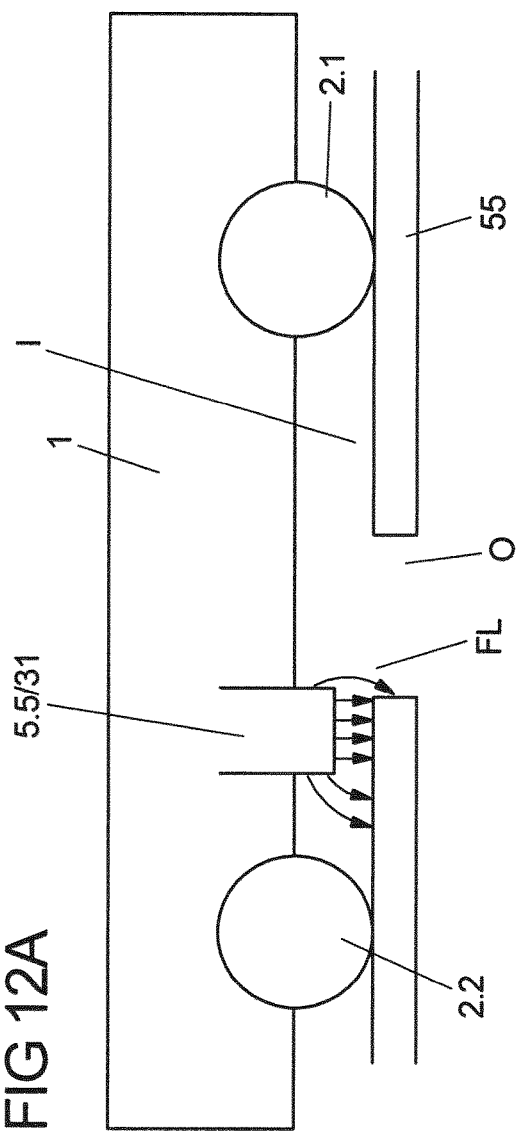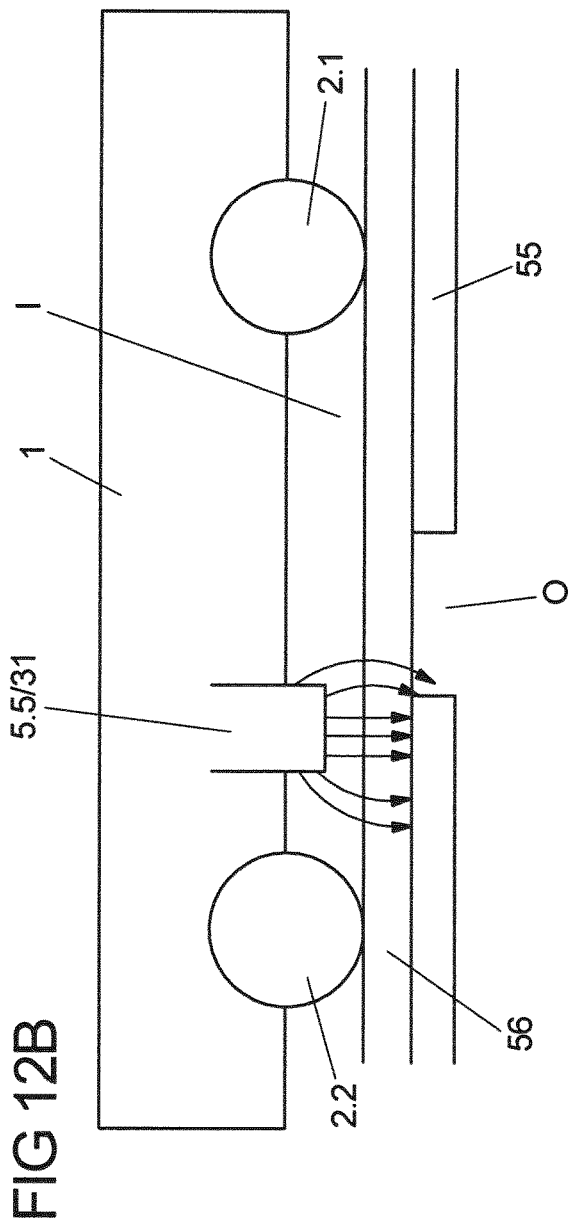

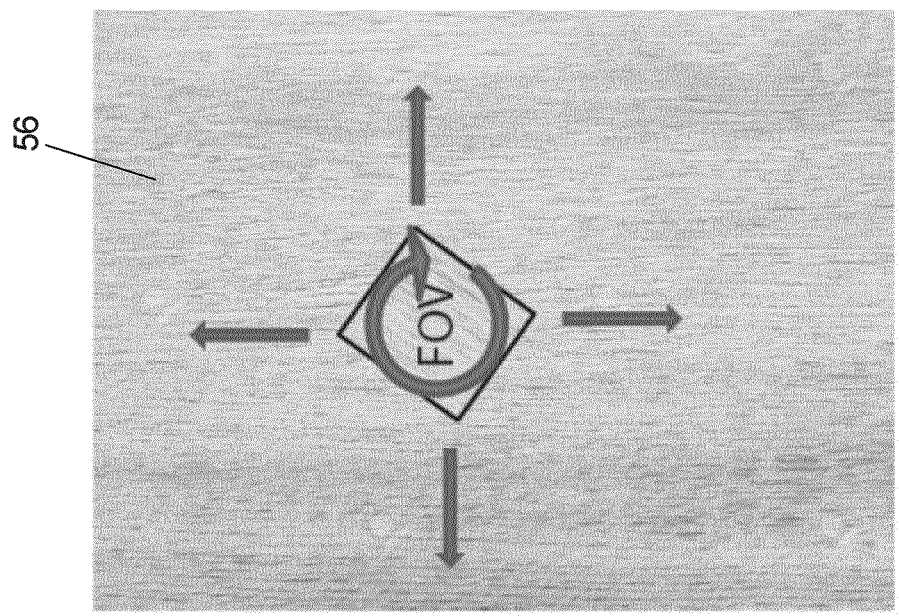
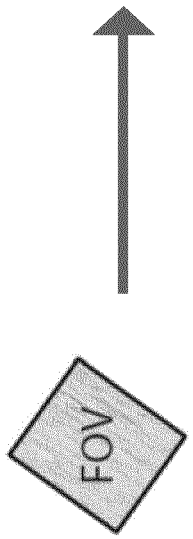
FIG 14A

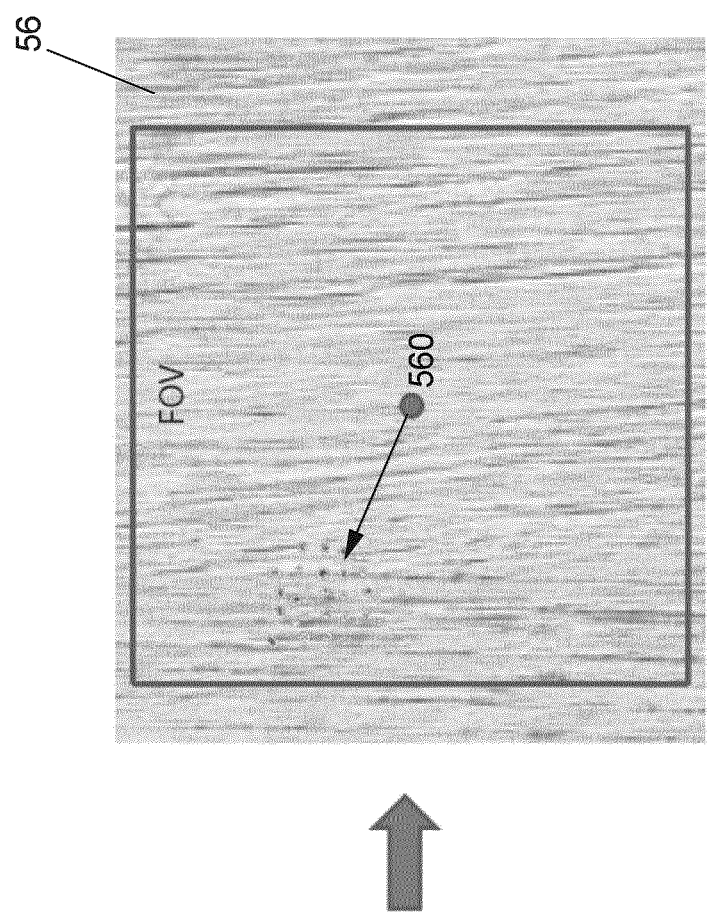
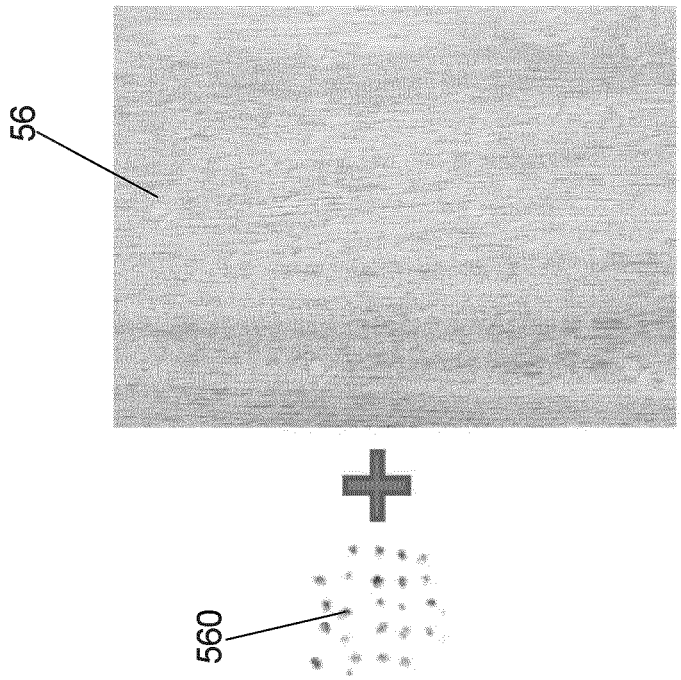
FIG 14B

VEHICLE HAVING AN ELECTRONIC DETECTION DEVICE FOR POSITIONING AN ADJUSTABLE INTERIOR OBJECT ON AN INTERIOR SURFACE IN THE VEHICLE

CROSS-REFERENCE TO RELATED APPLICATIONS

This application is the U.S. National Phase of PCT Application No. PCT/EP2020/070289 filed on Jul. 17, 2020, which claims priority to German Patent Application No. DE 10 2019 210 837.7, filed on Jul. 22, 2019, DE 10 2019 210 835.0 filed Jul. 22, 2019, DE 10 2019 213 012.7, filed Aug. 29, 2019, DE 10 2019 123 369.0, filed Aug. 30, 2019, DE 10 2019 214 152.8, filed Sep. 17, 2019, and DE 10 2020 203 147.9, filed Mar. 11, 2020, the disclosures of which are hereby incorporated in their entirety by reference herein.

TECHNICAL FIELD

The present disclosure relates to a vehicle and a vehicle interior provided with at least one interior object configured to be arranged and fixated within the vehicle interior.

BACKGROUND

Vehicles may include a vehicle interior that includes an interior surface that may form, for example, a loading area of the vehicle interior, to which interior objects, e.g. in the form of vehicle seats, tables and/or center consoles, can be fixed.

Furthermore, various electronic detection devices are known from practice, by means of which it can be monitored what position an interior object takes on an interior surface when the interior object is adjustable in a mechanically guided way. This for example relates to the setting of a longitudinal seat position of a vehicle seat that is adjustably mounted on a vehicle floor in a track-guided way via a pair of rails or several pairs of rails.

SUMMARY

One or more objects of the present disclosure may be to provide a vehicle in which a flexible arrangement of an interior object on an interior surface is improved.

According to one or more embodiments, the at least one interior object comprises at least one drive device for a non-mechanically guided displacement of the interior object on the interior surface of the vehicle. Furthermore, the electronic detection device is adapted to detect the reaching of a specified fixing position on the interior surface by the interior object.

The detection device hence is adapted to electronically detect at least when the interior object reaches a specified fixing position. In response thereto, the electronic detection device can trigger a fixation of the interior object at the fixing position.

Via the at least one drive device, the at least one interior object can be displaceable on the interior surface in a non-track-guided way. Hence, a guidance or specification of a path of displacement for the interior object by a rail, a track or a slotted link may not be provided. Rather, the interior object is freely displaceable on the interior surface. In this connection, a possibly motorized drive device can also be battery-operated and correspondingly comprise at least one energy accumulator for an autonomous displacement of the interior object on the interior surface.

Fixing positions, at which the interior object can be fixed to the interior surface can be specified on the interior surface. For example, a multitude of possible fixing positions on the interior surface are predefined.

In one design variant, the drive device includes at least one rolling body or a chain for the contact with the interior surface and the displacement of the interior object on the interior surface. A rolling body here, for example, is understood to be a roller, a wheel or a tire. Via a corresponding drive device comprising at least one rolling body or a chain, the interior object can be adjusted along the interior surface, for example, in a battery-operated way, possibly by remote control and/or by means of the electronic detection device.

In one or more embodiments, the at least one drive device includes an omnidirectional drive. Such an omnidirectional drive permits the displacement of the interior object along arbitrary directions in a spatial plane on the interior surface. For this purpose, an omnidirectional drive includes at least one omniwheel.

For fixation at a fixing position, at least one fixing element can be provided. By means of a fixing element, the interior object can be locked in a crash-proof way for example at a specified fixing position via a floor anchorage. This in particular includes the fact that a fixing element or a plurality of fixing elements are configured and adapted to anchor the interior object at a fixing position in a crash-proof way and hence secure the interior object against a displacement on the interior surface even under high acceleration forces occurring in the case of a crash.

In principle, a fixing element can be adjustably mounted on the interior object or on the interior surface. For example, in one design variant it is provided that the at least one fixing element is displaceably provided on the interior object and is adjusted into a fixing position when the electronic detection device detects that the interior object has reached a specified fixing position. Alternatively or additionally, at least one adjustable fixing element can be arranged on the interior surface.

The electronic detection device, via which a position of the interior object is detectable, in one design variant may include at least one component provided on the interior object. This component can be a passive or active component, i.e. a (passive) component that is detectable by a sensor element of the detection device, or an (active) component that actively sends signals to one or more receivers of the electronic detection device and/or by means of sensors detects at least one measurement quantity representative of the environment of the interior object, via which at least the reaching of a specified fixing position on the interior surface of the vehicle interior can be detected. A component of the electronic detection device provided on the interior object can be provided for example to detect the position of the interior object also during a displacement of the interior object along the interior surface. Alternatively, the component of the electronic detection device provided on the interior object can be provided merely for the detection that the interior object has reached the fixing position, without detecting a position of the interior object until reaching the fixing position and hence monitoring the adjustment of the interior object as such.

In one or more embodiments, a sensor element provided on the interior object comprises an integrated electronic evaluation unit, in particular an application-specific integrated circuit (ASIC). By integrating an electronic evaluation unit into the sensor already, the determination of an absolute position can be effected more quickly. Alternatively or additionally, a sensor element provided on the interior object can comprise an acceleration sensor and a gyrosensor, for example, as part of an inertial measurement unit. By integration of an acceleration sensor and a gyrosensor, an individual sensor element can be used to distinguish between a translatory adjusting movement and a rotatory adjusting movement of the interior object, hence e.g. detect along which of three mutually perpendicular spatial axes the interior object has been adjusted and about which of the three spatial axes the interior object has been rotated.

The electronic detection device in principle can be adapted to detect the position of the interior object during a displacement along the interior surface optically (for example by means of infrared) and/or magnetically and/or in a sound-based, in particular ultrasound-based way and/or on the basis of radio waves, in particular on the basis of at least one UWB signal (UWB=ultra-wideband) and/or on the basis of laser beams, in particular on the basis of a Lidar method (Lidar=light detection and ranging).

As an example, the electronic detection device consequently can be adapted to provide contactless detection upon reaching of the specified fixing position on the interior surface by the interior object. The proposed solution likewise covers also a design variant in which the reaching of the fixing position is detected in dependence on a known starting position. Via the electronic detection device—proceeding from a detected reference position on the interior surface —for example motor revolutions or revolutions of a drive shaft are counted, in particular by means of a Hall sensor. Alternatively or additionally, a path of displacement covered in two spatial directions can be determined with reference to acceleration values proceeding from a reference position.

In a sound-based detection it is provided for example that a structure of the interior surface surrounding the interior object is excited and with reference to the propagation characteristics of excited sound waves the position of the interior object is inferred.

In principle, the electronic detection device can comprise at least one component provided on the interior object. A position of the at least one component provided on the interior object can be determinable e.g. via at least one sensor element of the electronic detection device, which is provided on the vehicle interior and possibly is firmly installed. This for example includes the fact that on the interior object to be displaced a readable tag, in particular a readable RFID tag is present, whose position is detectable via a sensor element or a plurality of sensor elements within the vehicle interior.

Alternatively or additionally, a plurality of positioning aids, e.g. on the interior surface, a side wall and/or a headliner of the vehicle, form part of the electronic detection device. One or more positioning aids can be provided below a floor cover or in a floor cover of the vehicle. For example, the positions of the positioning aids are specified via a (virtual or real) grid. A positioning aid thus is disposed for example at a corner point of a corresponding grid or at a center point of a defined grid area in order to be able to directly infer a position at the grid and hence with respect to the interior surface via the detection of the corresponding positioning aid.

In an exemplary embodiment, the at least one component provided on the interior object is adapted to detect at least one of the positioning aids in order to determine a position and possibly also an orientation of the interior object on the interior surface. The component provided on the interior object thus for example is configured as an actively measuring sensor element that generates measurement signals for controlling a motorized drive device and hence a path of displacement of the interior object.

In one or more embodiments, at least one of the positioning aids can (also) be adapted and provided to postnormalize a drift of a position calculated via an acceleration sensor and/or gyrosensor. In particular in this connection the basic idea is that signals of a plurality of different and/or identical sensor elements of the electronic detection device are jointly evaluated. In particular, this means that signals of a plurality of sensor elements are transmitted to a common electronic evaluation unit of the detection device in a wire-bound and/or wireless way in order to provide for a combined evaluation of these signals by the electronic evaluation unit, on the basis of which it can then be determined whether the interior object has actually reached the desired position.

For example, the at least one component provided on the interior object comprises a camera. By means of a camera, for example an optical mark, e.g. an at least two-dimensional code, such as a QR code, or an LED present in the vehicle interior, in particular an IR-LED, is detectable as a positioning aid. A plurality of (at least two) optical marks can be provided for example in a specified pattern, e.g. arranged in a grid. For example, at least one QR code and/or at least one LED, in particular a plurality of QR codes and/or a plurality of LEDs can be provided on the interior surface and on an opposite ceiling, respectively, of a headliner of the vehicle in order to optically detect the same by means of the camera and thereby infer the position of the interior object on which the camera is provided. In an alternative design variant, this is a Time-of-Flight camera (ToF camera) that measures distances by a time-of-flight method. Via a ToF camera, e.g. the reaching of a fixing position can be detected when the fixing position is marked by a depression on the vehicle interior, which can be detected by the ToF camera. A mark, such as a corresponding code for determining the position, furthermore can be formed for example by pixels, a graining, a dot grid and/or by fluorescent color (with the latter being detected for example by using an IR camera).

In order to integrate electronically supported positioning into a vehicle environment and its materials on the basis of a camera and optically detectable coding on the interior surface in an aesthetically pleasing and yet robust manner with regard to evaluability, the coding in one design variant is hidden in a surface of the interior surface as optically and/or haptically detectable information. In this connection, for example, the interior surface then is provided with a wood decor. The position of the interior object then can be compared with a stored reference image via template matching in the form of a target/actual comparison of a recorded image of a section of the interior surface. To reduce the calculation effort, the wood decor can be provided with certain marks/codings in the form of small lines (matching the wood grain). These lines then are rotated by a defined angle e.g. with respect to the surrounding grain. Such a local rotation is optically readable comparatively easily and with little calculation effort and can be evaluated as an indicator for a particular position—e.g. via the degree of rotation and/or the number and/or arrangement, in particular spacing of the lines relative to each other. To further reduce the calculation effort, the actual pattern can be compared with the pattern of the entire interior surface only in the immediate vicinity to the last position of the interior object. To minimize degradation due to dirt and wear, an image repeatedly detected as deviating can be counteracted as a new reference image, so that a self-learning system is provided.

Possibly also independently of a camera provided on the interior object one design variant provides that a positioning aid may include at least one at least two-dimensional code. For example, a two-dimensional code, also referred to as a matrix code, is optoelectronically readable reliably and quickly and hence is suitable for a comparatively simple determination of the position of the interior object.

In one or more embodiments, at least one of the positioning aids on the interior surface (along a possible adjustment path between two fixing positions) comprises an electronically detectable defect. For example, a toothed rack can be provided as a positioning aid, in which a particular tooth is greater, i.e. broader and/or higher, and/or magnetized, in order to electronically infer a particular absolute position reached on the basis of this tooth.

As another example, at least one of the positioning aids comprises a searching wire on the interior surface, which comprises a wire end ending at a fixing position. Via a detector of the electronic detection device provided on the interior object, this searching wire can be detected. When the (further) displacement of the interior object is effected along the searching wire, the interior object thereby is guided to the fixing position.

To facilitate the finding of the searching wire by an object-side detector, the positioning aid can be mounted to be adjustable using the searching wire. For example, a rotatable positioning disk carrying the searching wire is provided as a positioning aid on the interior surface. The positioning aid in principle is adapted to be adjusted during a displacement of the interior object on the interior surface, for example, to be adjusted periodically or continuously, in order to accelerate a detection of the searching wire by the object-side detector. For example, the positioning aid is rotatable about an axis of rotation, such as about a pivot point coinciding with the fixing position.

In one or more embodiments, at least one of the positioning aids on the interior surface is part of a wire grid. Via a corresponding wire grid it can likewise be electronically detected at what point of this grid an interior object is present.

For example, at least one coil for generating an alternating magnetic field is provided on the interior object, via which a voltage can be induced on individual wires of the wire grid. By detecting the voltage at the wires influenced by the alternating field generated, a position of the coil and hence of the interior object including the coil on the wire grid can be determinable. Via the at least one coil, a voltage can be inducible merely in the vicinity of the interior object so that by determining at what wires an (increased) voltage is induced, it can be concluded at what position of the wire grid the interior object with the at least one coil is present.

When at least two coils are provided on the interior object, an orientation of the interior object with respect to the interior surface can also be detected, as the position of the coils relative to each other on the interior object is known.

In one or more embodiments, at least one of the positioning aids on the interior surface comprises an RFID tag. Due to the fact that via the data to be read out from the RFID tag, the same provides information on its position on the interior surface, it can thereby be determinable when the interior object is located on the corresponding RFID tag.

As another example, a plurality of RFID tags arranged in a grid are provided on the interior surface, whose readable data are each associated with a unique position on the interior surface. When at least one RFID reader coupled to the electronic evaluation unit of the electronic detection device is provided for reading out RFID tags, the RFID tags can be read out in a position-related way. From the data read out from an RFID tag, a current position of the interior object on the interior surface can thus be determined.

In one or more embodiments, one of the positioning aids comprises a line on the interior surface, and on the interior object at least one sensor element is provided in order to detect a course of the line. The line can be continuous or sectionally interrupted. The line can be visible or invisible for the human eye and/or contain fluorescent color.

For example, a light source, such as an LED, and at least two phototransistors are provided on the interior object. The light source then is adapted to emit light in the direction of the line on the interior surface, while the at least two phototransistors in turn are adapted to detect light of the light source reflected by the line, for positioning the interior object. The phototransistors then are coupled to the electronic evaluation unit in order to control the displacement of the interior object on the interior surface in dependence on light signals detected by means of the at least two phototransistors. For example, when merely one of the phototransistors detects reflected light, it can be concluded that not both phototransistors are positioned above the line and correspondingly the interior object is not disposed in an orientation to be assumed relative to the line that extends to the desired fixing position.

In another embodiment, the line on the interior surface is formed by a magnetic tape and on the interior object at least two Hall sensors are provided in order to detect the course of the line. Here as well, it can be concluded for example that the interior object is not displaced along the line to a fixing position when not both sensors can detect the magnetic tape. Alternatively or additionally, the magnetic tape can be formed with a magnetization alternating along its longitudinal extension. In this way, it can be electronically detected e.g. with reference to a detected sequence of alternating magnetizations, at what point along the magnetic tape the interior object is located.

In yet another embodiment, the electronic detection device may include at least two sensor elements based on different measurement principles in order to detect the reaching of the fixing position by the interior object. Different sensor elements, for example, may be combined with each other in order to avoid or at least reduce wrong detections. For example, via sensor elements based on different measurement principles the reaching of a fixing position can be detected redundantly, and a fixation via the at least one fixing element merely can be enabled when both sensor elements based on different measurement principles detect the reaching of the fixing position. Alternatively, it can be provided that at least one first sensor element is provided for rough positioning of the interior object, while at least one second sensor element is provided for fine positioning. This may include the fact that the at least one first sensor element is part of a first sub-system of the electronic detection device and the at least one second sensor element is part of a second sub-system of the electronic detection device. For example, a first sub-system provided for rough positioning comprises a Hall sensor and/or a capacitive sensor as first sensor element, which with reference to the revolution of a drive element of a motorized drive device permits the detection of a path of displacement and hence of a position of the interior object for rough positioning. The second sub-system comprises e.g. an optical and/or capacitive sensor as a second sensor element, via which a fixing position on the interior surface is detectable for fine positioning.

Alternatively or additionally, sensor elements based on different measurement principles can be provided to detect different paths of displacement or different phases during a displacement of the interior object. For example, a first sensor element can detect a position of the interior object in a first radius around a specified fixing position based on a first measurement principle (and hence possibly based on a first measurement quantity and/or a first resolution), while another, second sensor element can detect a position of the interior object in a second radius around the specified fixing position based on another, second measurement principle (and hence possibly based on another, second measurement quantity and/or another, second resolution), the second radius being smaller than the first radius. The first sensor element thus can serve for rough positioning, while fine positioning can be realized by means of the second sensor element.

In another embodiment, in which sensor elements based on different measurement principles are used, it can be provided for example that the electronic detection device is configured to calculate position information based on signals of at least two sensor elements employing different measurement principles. This for example includes a combination of at least one acceleration sensor with at least one UWB sensor or a radio-based sensor, such as a Bluetooth sensor. This for example makes use of the fact that an acceleration sensor operates very quickly, but a position determined by the same exhibits long-time drifts, while in the case of a UBW sensor or a radio-based triangulation, e.g. Bluetooth, short reaction times can be realized, but accurate mean position information can be delivered only over comparatively very long periods. Thus, by utilizing different measurement principles the strengths of each measurement principle can be joined for determining the position, and possible disadvantages can be compensated.

For example, one design variant provides that an acceleration sensor and a radio sensor or radio transmitter, such as a Bluetooth sensor, are provided on a motor board of a drive of the interior object. Further radio transmitters then can e.g. be firmly installed in the vehicle. Via the radio transmitters in the vehicle, the radio transmitter on the motor board can be trilaterated. Furthermore, signals or data of an object-side acceleration sensor can be transmitted (which can be data that have already been preprocessed, e.g. averaged, by a microcontroller on the motor board). In this way, a central control unit (provided in the vehicle or on the interior object) and/or a local control unit (provided on the motor board) can determine the position of the interior object via the data of the acceleration sensor and the radio trilateration.

A combination of different sensor elements for example can include a combination of the aforementioned measurement principles (optical, magnetic, sound-based, etc.), on the basis of which the electronic detection device can detect a position of the interior object during the displacement on the interior surface.

The sensor elements utilizing different measurement principles accordingly can also be adapted to control a displacement of the interior object in different phases until reaching the fixing position. While for example in a first phase a rough positioning of the interior object on the interior surface is effected via at least one first sensor element, at least one second sensor element in a second phase is adapted to guide the interior object, which already has approached the desired fixing position up to a minimum distance, up to the fixing position.

In principle, at least one adjustment part provided on the interior object can be adjustable when the interior object is fixed to the interior surface. For example, an adjustment part of the interior object is adjustable with respect to the interior surface and/or with respect to a base of the interior object fixed to the interior surface at least or only when the interior object is properly fixed in a fixing position on the interior surface via the at least one fixing element. Consequently, the interior object can no longer be displaced in a non-mechanically guided way along the interior surface and hence along a spatial plane defined thereby for example via its battery-operated drive, when in addition a component of the interior object or an adjustment part arranged thereon shall be adjusted. This for example includes the fact that a vehicle seat as an interior object includes an adjustable adjustment part in the form of a headrest, a seat cushion and/or a backrest, which independently of a battery-operated motorized drive device only is adjustable when the vehicle seat has taken a proper fixing position on the interior surface of the vehicle and has been fixed correspondingly.

An interior object of a proposed vehicle, for example, may be a vehicle seat, a (center arm) console or a table. Such an interior object then is freely displaceable e.g. within the vehicle interior—in particular when the vehicle is stationary—and—when the vehicle is traveling—is fixed in a fixing position via the at least one fixing element on the interior surface.

In principle, it can be provided in one design variant that the electronic detection device likewise is adapted and provided to detect a potential obstacle in an adjustment path of the interior object. Upon detection of a potential obstacle, the electronic detection device then can be used to output an acoustically, haptically and/or visually perceptible alarm signal and/or a motorized drive device can be actuatable for stopping and/or reversing an adjusting movement. In this way, it is prevented for example in an electronically controlled way that an interior object on its way to a desired fixing position collides with another object, in particular a person or an item in the interior of the vehicle, and/or that during a subsequent change in position after the fixing position has been reached already, such as during a rotation of a vehicle seat about the vertical, the interior object collides with another object.

Another aspect of the proposed solution relates to the use of an electronic detection device in order to optically, magnetically, in a sound-based way, on the basis of radio waves, in particular on the basis of at least one UWB signal, and/or on the basis of a laser beam, detect when a non-mechanically guided displaceable interior object reaches a fixing position on an interior surface of a vehicle. This in particular includes the fact that it is detected e.g. via the closing of an electrical connection, via a force transducer (i.e. in particular piezoelectrically), when the non-mechanically guided displaceable interior object reaches a fixing position on the interior surface of the vehicle.

One design variant for example provides that the interior object need not necessarily be adjustable on the interior surface in a motor-driven way. Via the electronic detection device, a position of the interior object (possibly manually) positioned on the interior surface initially can be detectable, and subsequently it can be detectable via the electronic detection device when the manually displaced interior object reaches a particular fixing position. The reaching of the fixing position then is signaled for example in an acoustically, haptically and/or visually perceptible way. Thus, a feedback is signaled to a person displacing the interior object when the interior object reaches the fixing position.

Another aspect relates to the use of an electronic detection device in order to optically, magnetically, in a sound-based way, on the basis of radio waves, in particular on the basis of at least one UWB signal, and/or on the basis of a laser beam control a path of displacement of a non-mechanically guided displaceable interior object up to a fixing position on an interior surface of a vehicle.

In one or more embodiments, in which the electronic detection device detects and/or controls the reaching of the fixing position by the interior object in a sound-based way, the electronic detection device likewise is used to detect the presence or a movement of an object, e.g. of a person or an item, in the vehicle interior and/or a person speaking in the vehicle interior. The electronic detection device for example is adapted to detect and evaluate structure-borne sound and/or air-borne sound in order to on the one hand detect and/or control the reaching of the fixing position by the interior object and on the other hand to provide an additional function. For example, the electronic detection device then can be used to detect when a person is moving in the vehicle interior, for example in order to infer a walking path of the person and/or to localize a person in the vehicle interior. Alternatively or additionally, it can be detectable via the electronic detection device whether a person has started to speak.

The attached Figures by way of example illustrate possible design variants of the proposed solution.

BRIEF DESCRIPTION OF THE DRAWINGS

In the drawings:

FIGS. 2A-2C in side views show the interior surface of FIG. 1 with a vehicle seat in two different fixing positions and in different phases during a displacement from a first fixing position to a second fixing position and a subsequent rotation of the vehicle seat;

FIG. 5 schematically and in a top view shows the interior surface of the vehicle of FIG. 1 by illustrating an electronic detection device that includes at least one component on the interior object in the form of the vehicle seat;

FIG. 6 in a view corresponding with FIG. 1 shows another design variant of a vehicle with fixing positions provided at corner points of a grid, on each of which a rotatable positioning aid comprising a searching wire is arranged;

FIG. 7 in a view corresponding with FIG. 1 shows another design variant of a vehicle in which a wire grid is provided for positioning an interior object on the interior surface;

FIG. 8 in a view corresponding with FIG. 1 shows another design variant of a proposed vehicle in which an RFID grid is provided on the interior surface;

FIG. 10A sectionally shows an interior object with a part of an electronic detection device, which for an electronically controlled rough positioning of the interior object on the interior surface comprises a motorized drive device with at least one Hall sensor;

FIG. 10B shows an enlarged representation of the motorized drive device of FIG. 10A;

FIGS. 12A-12B sectionally show a design variant with a vehicle seat in which a sensor element, as part of a detection device, is integrated in a fixing element or arranged on the same, wherein possible fixing positions are specified by a perforated plate on the interior surface, and this perforated plate is exposed on the interior surface (FIG. 12A) and is covered by an additional floor covering (FIG. 12B);

FIGS. 14A-14B show representations of possible marks on a floor covering of the interior surface for the electronic detection of a position of an interior object.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A known vehicle interior is provided in DE 10 2017 210 608 A1 which includes interior objects that are adjustable on an interior surface in a non-mechanically guided way. In this connection, DE 10 2014 210 608 A1 for example proposes to provide for an adjustment of an interior object via an air cushion or via a rolling device. It remains open, however, at what points a proper fixation of such an interior object shall be made possible and how such a fixing position possibly is specified.

Figure 1:
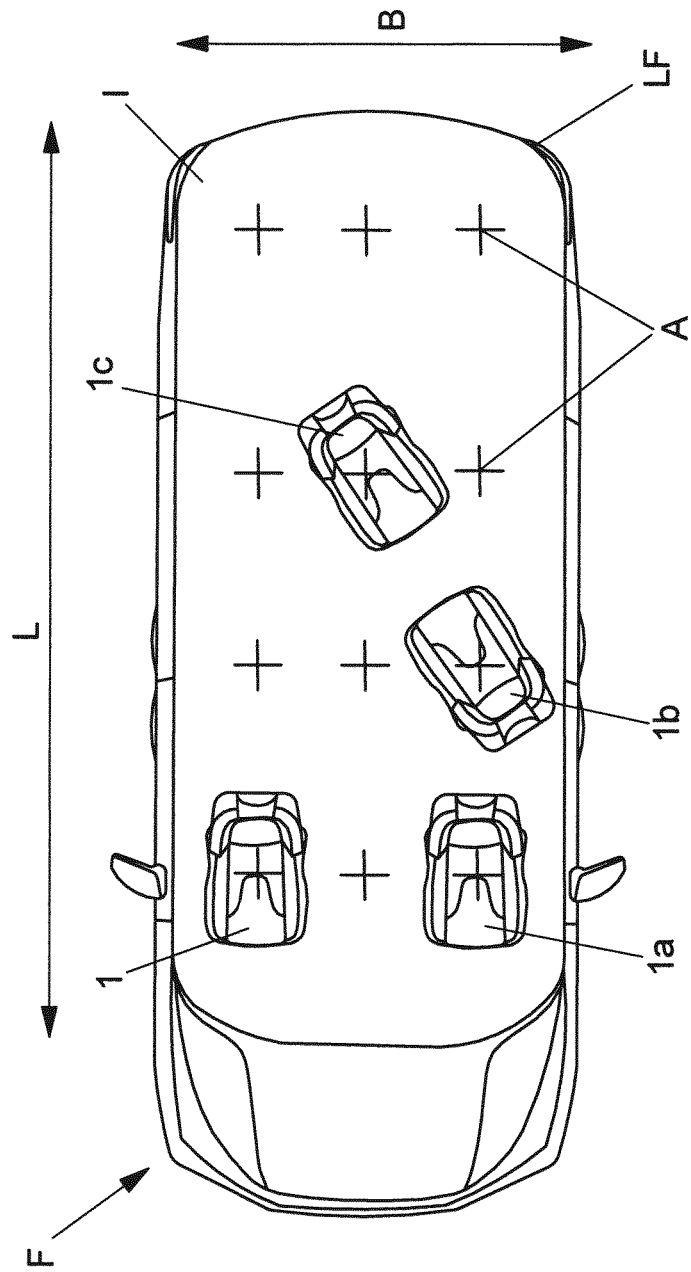
FIG. 1 in a sectional top view of an interior surface shows a vehicle interior of a design variant of a proposed vehicle with a plurality of interior objects in the form of vehicle seats freely displaceable therein.

FIG. 1 by way of example shows a vehicle F which in its interior defines a planar interior surface I of a length L and a width B, which extends from a dashboard of the vehicle F to its rear-side loading sill LF. The length L for example lies in the range of 5 to 7.5 m and the width B lies in the range of 1.5 to 2 m. On the interior surface I a plurality of anchor points A are provided, which serve as fixing positions for fixing different interior objects. The anchor points A here are provided as corner points of a virtual grid distributed on the interior surface I.

In the present case, for example different vehicle seats 1, 1a to 1c can be fixed at the anchor points A as interior objects. The vehicle seats 1, 1a to 1c here are configured as freely adjustable units that can be displaced on the interior surface I in a non-mechanically guided way, for example, in a non-mechanically track-guided way. When a vehicle seat 1, 1a to 1c is properly arranged at an anchor point A and arranged with a base 12 of the seat 1, 1a to 1c (cf. in particular FIGS. 2A to 2C), the respective vehicle seat 1, 1a to 1c can be fixed to the interior surface I in a crash-proof way. For example, a vehicle seat 1, 1a to 1c in this way can be placed on the interior surface I via a rear loading sill LF (with open liftgate of the vehicle F) and can then, in an electronically controlled way, be displaced by a user to a desired anchor point A on the interior surface I and be fixed there. The arrangement of various interior objects like the vehicle seats 1, 1a to 1c thus is extremely variable and can be designed by a user in almost any way.

The side views of FIGS. 2A, 2B and 2C by way of example illustrate a vehicle seat 1 in more detail. The vehicle seat 1 includes a base 12 with a battery-operated motorized drive device 12A. The base 12 displaceable via the motorized drive device 12A carries a seat part 11 and a backrest 10 of the vehicle seat 1. The backrest 10 can be adjustable in its inclination with respect to the seat part 11. Alternatively or additionally, the seat depth can be adjustable via an adjustment of the seat part 11 on the base 12.

The base 12 is freely displaceable on the interior surface I via an omniwheel or a plurality of omniwheels 2.1, 2.2. A torque for displacing the vehicle seat here is applied via a drive motor 120 that is accommodated within the base 12. This drive motor 120 is supplied with power via a battery 121 as an energy accumulator accommodated within the base 12. The battery 121 here can be charged independently of the vehicle via a terminal provided by a connector 122 on the base 12. The vehicle seat 1 thus can be charged on an electric power supply separately from the vehicle F. For this purpose, a vehicle-independent charging station is provided, for example.

When the vehicle seat 1 is provided at one of the anchor points A1, A2 shown in FIGS. 2A, 2B and 2C, the vehicle seat 1 can be fixed via a vehicle-side fixing element in the form of a fixing bolt 31. For this purpose, the fixing bolt 31 is turned upwards into a coupling portion 123 of the base 12 at the anchor point A1. In addition to the fixing bolt 31 shown by way of example, further fixing elements such as fixing bolts 31 can be provided in order to fix the base 12 and hence the vehicle seat 1 at the anchor point A1 of the interior surface I in a crash-proof way.

Via the fixing bolt 31 engaging into the base 12 and hence present in a fixing position, a connection to a vehicle-side energy source, hence to a vehicle-side battery, can also be provided in the present case. Via the electrical connection, for example the battery 121 can then be charged (for example, when the vehicle is traveling).

Alternatively or additionally, via the coupling to the electric energy supply of the vehicle F at least one additional electromotive drive of the vehicle seat 1 can be supplied with power in order to for example adjust the backrest 10 or the seat part 11 in a power-operated way. For example, the seat part 11 can be rotatable in a power-operated way on the base 12 about a vertical axis extending parallel to a spatial direction z by more than 90°, for example, by up to 180° or even by 360°, at least when the base 12 is properly fixed at an anchor point A1 (or A2; cf. FIG. 2C).

In response to a user request for operation, the vehicle seat 1 can be displaced along the interior surface I from the anchor point A1 to another anchor point A2. For this purpose, the fixing bolt 31 initially is retracted into a starting position on the interior surface I and the base 12 thereby is released. The vehicle seat 1 then can motorically be displaced along a direction of displacement R from the anchor point A1 to the anchor point A2 by means of the omniwheels 2.1, 2.2. This power-operated displacement of the vehicle seat 1 is controlled via an electronic detection device D, which in the present case includes a detection element 4 provided on the base 12. For example, this is a tag 4 which in cooperation with at least one vehicle-side sensor element of the detection device D provides for an electronic detection of the position of the seat 1 on the interior surface I.

In this way, it is possible for example to electronically detect when the vehicle seat 1 has reached the (second) anchor point A2, namely in such a way that a vehicle-side fixing bolt 32 can engage into the coupling portion 123 of the base 12 at this (second) anchor point A2 in order to fix the vehicle seat 1 at the anchor point A2. Thereafter, the vehicle seat 1 for example can be rotated about the vertical axis by 180°.

Figure 4:
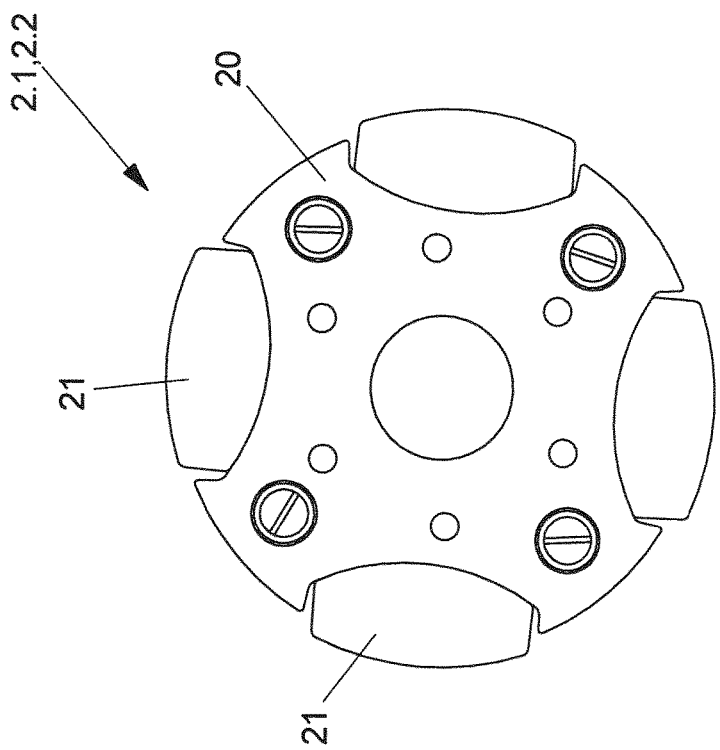
FIG. 4 in a top view shows another design variant of an omniwheel for use in a vehicle seat of FIGS. 2A to 2C.
Figure 3:
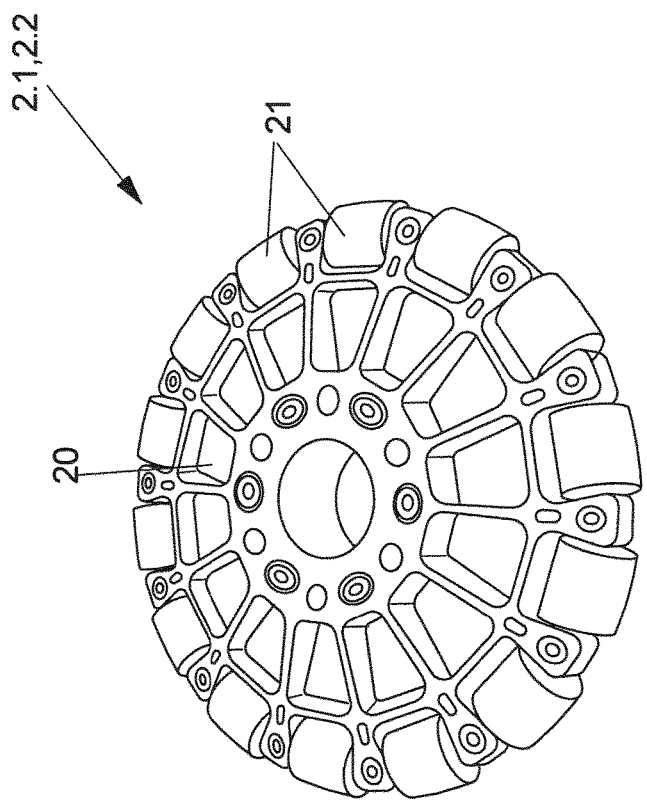
FIG. 3 in a perspective view shows an exemplary embodiment for an omniwheel for use in the vehicle seat of FIGS. 2A to 2C.

FIGS. 3 and 4 by way of example illustrate possible design variants for an omniwheel 2.1, 2.2 on the base 12 of the vehicle seat 1. FIG. 3 for example shows a perspective view of an omniwheel 2.1, 2.2 with a disk-shaped roller support 20 on whose circumference a plurality of rollers 21 are rotatably mounted. In the design variant of an omniwheel 2.1, 2.2 of FIG. 4, merely four rollers 21 each are rotatably arranged on a disk-shaped roller support 20 offset from each other by 90° each about a center of the roller support 20. Via each of the roller supports of FIGS. 3 and 4 an adjustment is possible in each spatial direction along a plane.

FIG. 5 in a top view by way of example illustrates a possible design of a detection device D, via which the position of a vehicle seat 1 can be detected during a displacement on the interior surface I. In the illustrated design variant, four sensor elements 5.1-5.4 are provided at defined positions of the vehicle interior and possibly on the interior surface I of the vehicle F (e.g. at its corner points).

The vehicle seat 1 furthermore includes a tag 4 and possibly an additional tag 4a. The tags 4, 4a here can be detected via the sensor elements 5.1-5.4, for example by the tags 4, 4a actively emitting signals that can be received by the sensor elements 5.1-5.4, or by the sensor elements 5.1-5.4 being read out in the manner of an RFID label. In this way, a position of the vehicle seat 1 within a spatial detection field on the interior surface I defined or monitored by the sensor elements 5.1-5.4 can be detected by means of the detection device D. Via an electronic evaluation unit AE of the detection device D coupled to the sensor elements 5.1-5.4, a position of the vehicle seat 1 on the interior surface I then can be determined from generated sensor signals, e.g. by means of triangulation.

To improve the detection of a position of the vehicle seat 1 and avoid wrong detections, different measurement principles for example are combined with each other so that the position of the vehicle seat 1 on the interior surface I is monitored via sensor elements 5.1-5.4 utilizing different measurement principles. For example, a Lidar system, a radio-based tracking, based for example on electromagnetic waves, such as radar waves, UWB, Bluetooth, a searching wire in the floor or on the ceiling, a detection on the basis of infrared signals and/or ultrasonic signals can be provided.

In the design variant of FIG. 5, the detection device D additionally includes a transmitter unit 65 which with reference to the position of the vehicle seat 1 on the interior surface I determined by the electronic evaluation unit AE sends control signals to the motorized drive device 12 of the vehicle seat 1. Here, the vehicle seat 1, for example likewise on the base 12, includes a receiver unit 61 that is adapted to receive the control signals of the transmitter unit 65. The receiver unit 61 is coupled to the drive motor 120 of the base 12 in order to displace the vehicle seat 1 corresponding to the control signals 65 and hence for example, in dependence on the detected position of the vehicle seat 1 on the interior surface I to a desired anchor point A, A1 or A2.

The displacement of the vehicle seat 1 here can be controllable for example by a user by means of a control application, such as a control application installed on a mobile phone. Alternatively or additionally, a particular position of a vehicle seat 1 on the interior surface I can be preconfigured, possibly also in combination with specified positions for further interior objects, such as for example a center arm console or a table. In this way, a user for example can select a particular preconfiguration and via the detection device D cause the vehicle seat 1—and possibly further interior objects—to be automatically moved into position. A corresponding control for the displacement of a vehicle seat 1 (or further interior objects) on the interior surface I alternatively or additionally can be integrated into the vehicle F. This for example, includes the setting and future execution of one or more preconfigurations on a vehicle-side operating unit for the arrangement of one or more interior objects.

In an exemplary method for displacing a vehicle seat 1 by means of the detection device D, the same for example is initially switched on. This can be followed by the fact that the sensor elements 5.1-5.4 initially are synchronized and checked for operability. Then, one of the tags 4, 4a, for example a first tag 4, is queried by means one of the sensor elements 5.1. This first tag 4 sends a response signal that is received by all sensor elements 5.1-5.4. Via the electronic evaluation unit AE, the runtime differences then are evaluated, which result from querying the tag 4 and from the (response) signal of the tag 4 received in response thereto at the individual sensor elements 5.1-5.4. Then, a position value representative of the position of the tag 4 and hence of the vehicle seat 1 can be calculated therefrom.

Via an analogous procedure for the further tag 4a a further position value is obtained for the vehicle seat 1. This further position value can be used for a (plausibility) check of the position value determined by means of the first tag 4 and/or for a determination of an orientation of the vehicle seat 1 with respect to the sensor elements 5.1-5.4 on the interior surface I. With reference to the position of two tags 4, 4a, which are arranged on the vehicle seat 1 in a particular, fixed position relative to each other, it can not only be determined at what point the vehicle seat 1 is located, but also how the vehicle seat 1 or its base 12 is oriented on the interior surface I. On the basis of the determined position(s) of the vehicle seat 1 the displacement of the vehicle seat 1 then is effected, until the same has reached a desired fixing position at which the vehicle seat 1 is fixed and hence can be secured in its reached fixing position at an anchor point A, A1 or A2.

FIG. 6 shows another design variant of a proposed vehicle F, in which it can be controlled and detected by means of an electronic detection device D that an interior object like the vehicle seat 1 reaches a proper fixing position of an anchor point A. The plurality of anchor points A here are arranged on the interior surface I according to a grid, here a rectangular grid. At each anchor point A a positioning aid in the form of a rotatable positioning disk 50 is provided, which carries a radially extending searching wire 51.

A rough positioning of the vehicle seat 1 for an approach to the appropriate positioning disk 50 of a desired anchor point A in a first phase is effected for example via a measurement method illustrated in FIG. 5 according to a first measurement principle, for example on the basis of triangulation and/or UWB signals. A subsequent fine positioning in a second phase of the displacement of the interior object 1 up to the desired fixing position at an anchor point A then is effected by means of the searching wire 51. The vehicle seat 1 then merely follows the searching wire 51 up to a wire end of the searching wire 51 ending at the anchor point A. In this connection, FIG. 6 illustrates a first adjustment along a first direction of displacement R1 for the first phase of the displacement and a subsequent displacement along a second direction of displacement R2 up to the anchor point A.

To accelerate the finding of a searching wire 51 on a positioning disk 50, the positioning disks 50 on the interior surface I (possibly below a floor covering) are rotatable so that the individual positioning disks 50 or also only one selected positioning disk 50 can be put into rotation at the desired anchor point A, until the vehicle seat 1 has reached its specified fixing position.

Alternatively or additionally, the detection device D can comprise a camera K corresponding to FIG. 6. This camera K can be provided within the vehicle interior in order to detect and control the path of displacement of the vehicle seat 1.

Alternatively, the camera K can also be provided on the vehicle seat 1 itself. The camera K for example detects optical positioning aids (additionally or as an alternative to further positioning aids like the positioning disks 50) on the interior surface I in order to infer the current position of the vehicle seat 1 on the interior surface I and the reaching of the desired fixing position. Corresponding optical positioning aids, which can be detected and evaluated via the camera K, comprise for example QR codes or LEDs. Then, for example a unique position identification number is embedded in the respective QR codes. The emission characteristics of the LEDs in turn can be modulated differently for example, so that via the receipt of the emitted light it likewise is clear what LED/what LEDs is/are detected by the camera K and at what position the vehicle seat 1 thus is disposed on the interior surface I. The LEDs for example, can be IR LEDs.

A corresponding arrangement of positioning aids to be detected via the camera K can alternatively also be provided on the ceiling of the vehicle F. Furthermore, a camera K can be combined with the positioning disks 50 or a subsequently explained design variant.

In the design variant of FIG. 7 a wire grid 52 is provided on the interior surface I. This wire grid 52 consists of a plurality of wires intersecting at right angles, which thereby form a passive wire mesh in the floor of the vehicle interior. In the exemplary embodiment of FIG. 7, the vehicle seat 1 includes at least one coil 4b as part of the detection device D. Via the coil 4b an alternating magnetic field is generated, which in the vicinity of the vehicle seat 1 induces a voltage in wires 520 and 521 of the wire grid 52. These wires 520 and 521 are thereby activated, while the wires 522 not or at least not significantly influenced by the alternating magnetic field of the coil 4b remain inactive. Due to the voltage measurable at the activated wires 520 and 521, the current position of the vehicle seat 1 on the wire grid 52 and hence on the interior surface I can then be inferred. When two coils 4b are provided on the vehicle seat 1, an orientation of the vehicle seat 1 on the interior surface I can also be inferred.

In the design variant of FIG. 8, an RFID grid 53 with a plurality of RFID tags 530 as positioning aids is provided on the interior surface I. The RFID tags 530 are placed in the form of a mosaic (not visible on the interior surface I) and thereby form a network of RFID tags 530 existing over the entire interior surface I or at least over a large part of the interior surface I. Each RFID tag 530 is assigned a unique identification number (ID) as an xy-coordinate that can be read out by an RFID reader on the vehicle seat 1. This RFID reader is coupled to the electronic evaluation unit AE of the electronic detection device D so that the RFID grid 53 provides electronically usable information about the point at which the vehicle seat 1 currently is located and how the vehicle seat 1 can get to a desired anchor point A.

Figure 9:
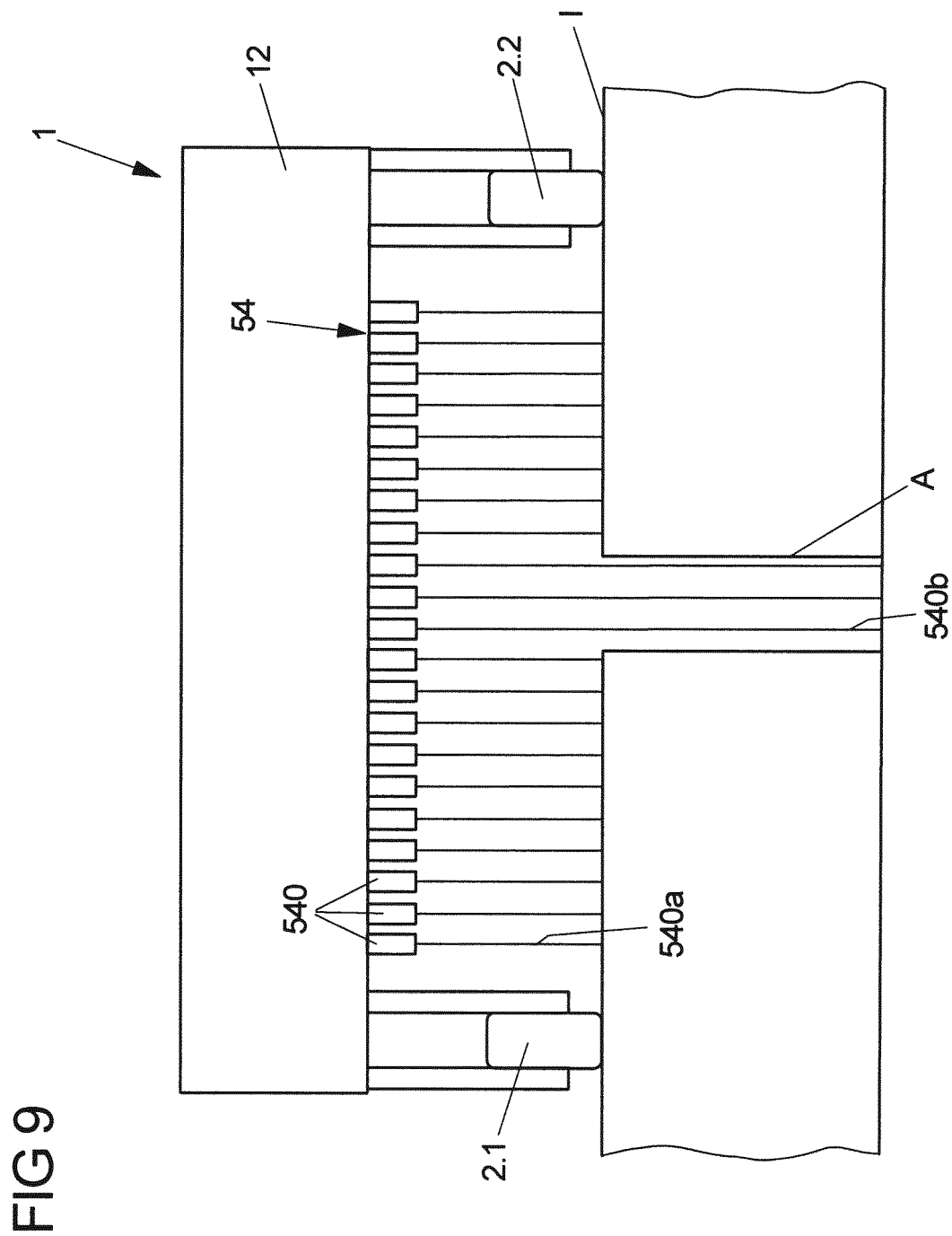
FIG. 9 sectionally shows an interior object and a part of an interior surface of a vehicle in a sectional view, wherein by means of a plurality of lighting elements on the underside of the interior object a recessed fixing position is optically detectable.

FIG. 9 sectionally illustrates a design variant of a base part 12, for example for a vehicle seat 1, 1*a*, 1*b* or 1*c*, on whose underside an illumination array 54 with a plurality of lighting elements 540 (e.g. arranged equidistantly to each other) is provided. A lighting element 540 here for example is formed by an LED or a laser diode. Each lighting element 540 emits a light beam 540*a* or 540*b* in the direction of the interior surface I. Via a matrix of sensor elements, for example as part of a ToF camera, it can be inferred from the emitted light beams 540*a*, 540*b* at what distance to the underside of the base 12 portions of the interior surface I currently located below the base 12 are disposed.

When an anchor point A now is marked by a corresponding depression in the interior surface I, a measurable greater distance is present at a region of the illumination array 54 opposite the anchor point A. A corresponding depression thus can be detected and be used as an indicator for the reaching of the anchor point A. Different anchor points A can be designed to be clearly distinguishable from each other for example by different depths.

FIGS. 10A and 10B sectionally show an interior object, e.g. the vehicle seat 1, with a part of an electronic detection device D, which for an electronically controlled rough positioning of the interior object on the interior surface I comprises motorized drive devices 22A, 22B each having at least one Hall sensor 222.

On the basis 12 of the interior object, two wheels 22.1, 22.2 are rotatably mounted for the motorized adjustment of the interior object. The wheels 22.1, 22.2 can e.g. be driven individually in order to provide for an adjustment in the plane without any separate mechanical steering system. Each wheel 22.1, 22.2 is assigned a drive motor with a pinion 220. The pinion 220 is connected to a shaft 221 in order to transmit a driving torque to a transmission 223 comprising e.g. a worm gear and thereby to the respective wheel 22.1, 22.2. On the shaft 221 at least one magnet 2210 is arranged. During a rotation of the shaft 210, the magnet 2210 is guided past the Hall sensor 222 so that a rotary movement of the shaft 221 can be electronically detected and evaluated.

By detecting the rotary movements of the shafts 221 of the two wheels 22.1, 22.2 it can be determined what distance has been covered by rotating the wheels 22.1, 22.2 and to what point—proceeding from a known starting position—the interior object has been displaced thereby. As possible changes in direction during the displacement are controlled via different speeds of the wheels 22.1, 22.2, for example, a standstill of the one wheel 22.1 or 22.2 and rotation of the other wheel 22.2, 22.1, the position of the interior object on the interior surface I adjusted by means of the motorized drive devices 22A, 22B can be determined via the evaluation of sensor signals of the Hall sensors 222.

The position information obtained in this way from the Hall sensors 222 is utilized for example for rough positioning of the interior object in order to adjust the interior object in the direction of a desired anchor point A, A1 or A2. Fine positioning at the respective anchor point A, A1, A2, so that a fixation at the anchor point A, A1, A2 is possible, is realized for example via further sensor elements of the electronic detection device D corresponding to the design variant of FIG. 9.

Figure 11:
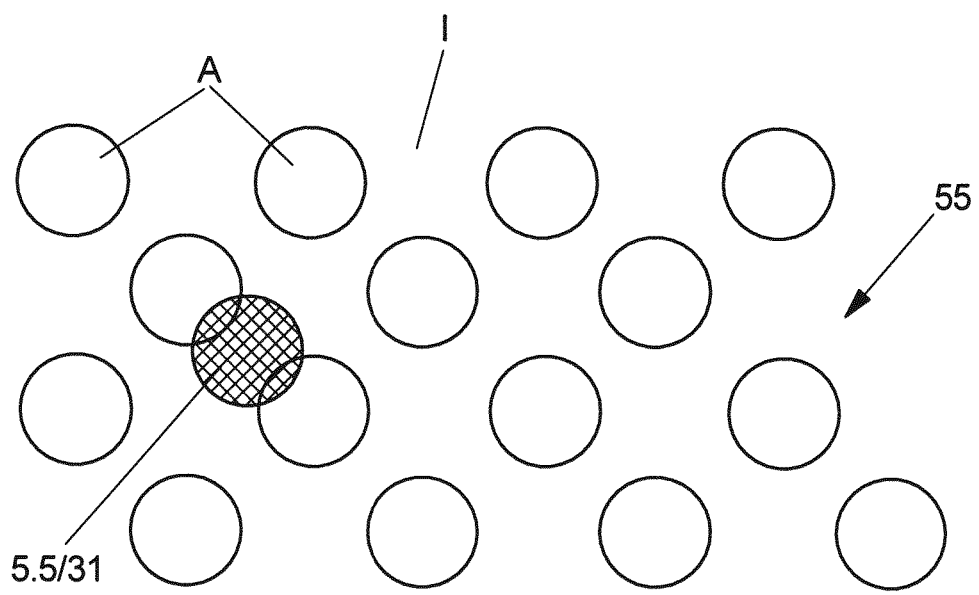
FIG. 11 sectionally shows a grid formed by a perforated plate for various fixing positions.

FIG. 11 sectionally shows a top view of the interior surface I, which here in one design variant is provided with a perforated plate 55 for defining the anchor positions A. On the holes of the perforated plate 55 an interior object, such as for example the vehicle seat 1, can be properly fixed via one or more object-side fixing bolts 31 when a desired fixing position has been reached. For scanning the perforated plate 55 and finding a desired fixing position at an anchor point A, the variant of FIG. 11 has a sensor element 5.5 as part of the detection device D, which for example operates capacitively and is provided on the fixing bolt 31. However, a capacitively operating sensor element 5.5 can also be used for rough positioning only.

For example, corresponding to the sectional representations of FIGS. 12A and 12B, the fixing bolt 31 comprising the transmitter element 5.5, which is guided with the interior object along the perforated plate 55 on the interior surface I, can use electric field lines FL to detect where a fixing opening O and an anchor point A defined thereby is located at a hole of the perforated plate 55. When a desired fixing position is reached, the fixing bolt 31 is inserted into the corresponding fixing opening O, for example by lowering the interior object 1 and/or by extending or lowering the fixing bolt 31.

While in the representation of FIG. 12A the perforated plate 55 with its holes defining the fixing openings O is exposed on the interior surface I, the design variant of FIG. 12B shows the perforated plate 55 covered by a floor covering 56. Due to being covered by the floor covering 56, the holes of the perforated plate 55 are not easily visible from outside.

In a possible development, a specified reference potential (with respect to the sensor element 5.5) can be applied to the perforated plate 55 in order to simplify the detection of the fixing positions. Alternatively or additionally, a plurality of punched tapes can be used instead of a continuous perforated plate 55. Then, differently modulated signals can be applied to the different punched tapes in order to distinguish the punched tapes from each other with reference to the signals received via the sensor element 5.5 and infer the current position of the interior object.

In principle, the holes in a perforated plate 55 and the fixing openings defined thereby can have different cross-sectional shapes. The holes for example can be round, for example, circular, triangular or quadrangular or hexagonal in cross-section.

In one design variant, an air cushion can be generated on the interior surface I via the holes of the perforated plate 55.

Figure 13:
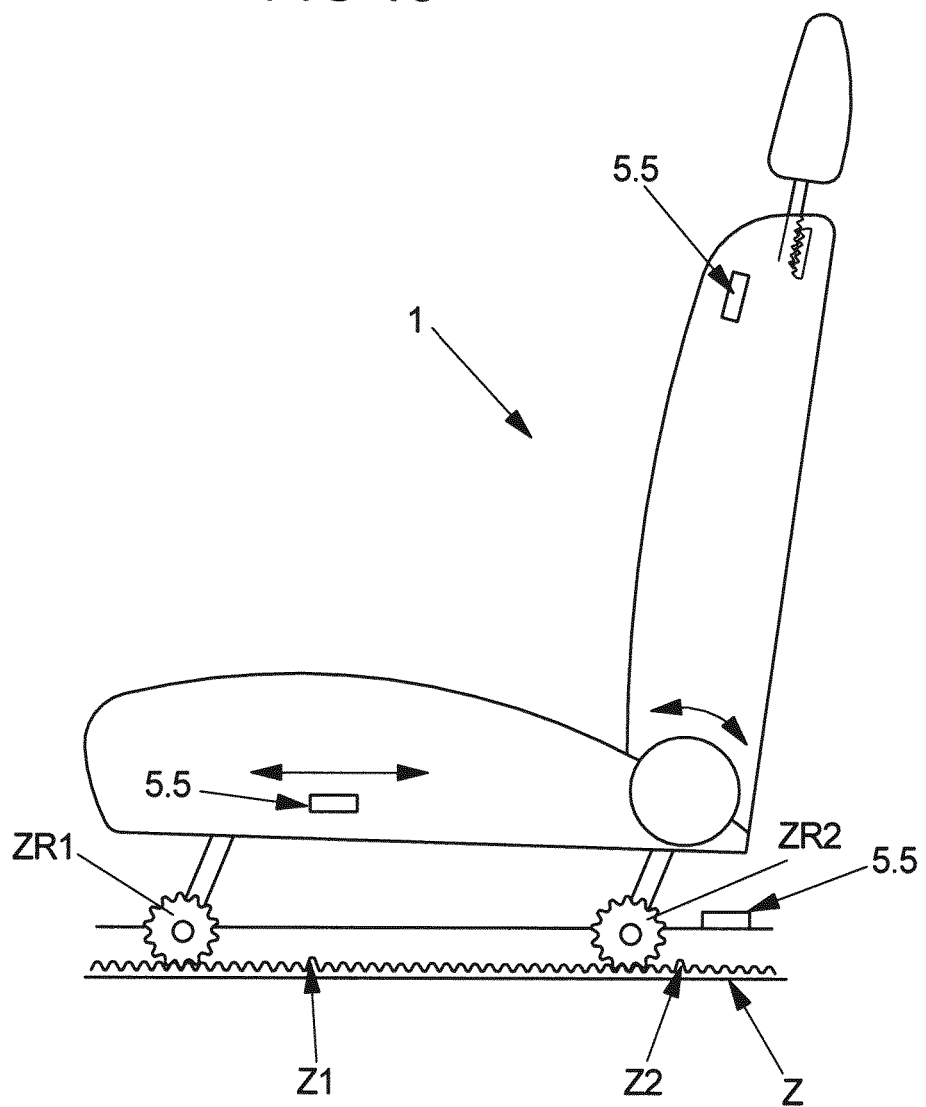
FIG. 13 shows a development of an interior object in the form of a vehicle seat with an illustration of various positions for a sensor element that comprises an acceleration sensor and a gyrosensor as well as an application-specific integrated circuit (ASIC) for the formation of an inertial measuring unit.

As is illustrated with reference to the schematic representation of FIG. 13, it is not absolutely necessary for the detection of a position of the vehicle seat 1, as an exemplary interior object, that the sensor element 5.5 be arranged on the fixing bolt 31 and/or be configured as a capacitive sensor. As an example, the sensor element 5.5 can also be configured as an inertial measurement unit comprising an integrated acceleration sensor and integrated gyrosensor as well as an electronic evaluation unit. Such a sensor element 5.5 then for example can detect an acceleration along three mutually perpendicular spatial axes as well as a rotation about these three spatial axes. In this way, an absolute position within the vehicle F can be inferred by using an integrated electronic evaluation unit. FIG. 13 shows various possible positions for a sensor element 5.5, without of course having to provide a corresponding sensor element 5.5 each at all of the positions shown.

WWI For example, one design variant provides that an acceleration sensor and a radio sensor or radio transmitter, such as e.g. a Bluetooth sensor, are provided on a motor board of a drive of the interior object, here in the form of the vehicle seat 1. Further radio transmitters are firmly installed in the vehicle F. Via the vehicle-side radio transmitters, the object-side radio transmitter on the motor board can be trilaterated. Furthermore, signals or data of an object-side acceleration sensor can be transmitted, which possibly have been preprocessed (e.g. averaged) already by a microcontroller on the motor board. In this way, a central, vehicle-side or object-side control unit and/or a local control unit provided on the motor board can determine the position of the vehicle seat 1 via the data of the acceleration sensor and the radio trilateration.

FIG. 13 furthermore illustrates an additional (optional) positioning aid in the form of a toothed rack Z on the interior surface I. This toothed rack Z forms teeth Z1 and Z2 of different heights so that rotatably mounted gear wheels ZR1 and ZR2 provided on the interior object/vehicle seat 1 can mesh with the toothed rack Z during a displacement on the interior surface I. When one of the gear wheels ZR1, ZR2 impinges on a tooth elevated with respect to the remaining teeth Z1 and hence acting as a specific defect on the toothed rack Z, the vehicle seat 1 experiences an acceleration for example, along the vertical, which is hardly or not perceptible for a seat user. Such an acceleration is detectable via an acceleration sensor of the sensor element 5.5 in order to determine a current position, which is specified by the tooth Z2 on the toothed rack Z, within the vehicle F.

Via a backrest-side transmitter element 5.5, the position of a headrest of the vehicle seat 1 moreover can additionally be determinable in the illustrated design variant. The headrest can analogously be displaceable along a toothed rack which likewise includes different types of teeth. Of course, there is also conceivable a design variant in which the electronic evaluation unit of the sensor element 5.5 additionally evaluates a temperature detected by means of the sensor element 5.5.

FIGS. 14A and 14B illustrate further design variants for an optically assisted position detection by means of the detection device D. It can be provided for example that at each point a unique pattern is present for the size of an image recorded by means of a camera of the detection device D, which allows to draw conclusions about the current position of the interior object. The corresponding camera—as already explained above—here can be arranged on the interior object, such as the vehicle seat 1, and be aligned with the interior surface I. Via an electronic evaluation unit of the detection device D so-called template matching is performed in order to identify the unique pattern and thereby infer the position of the interior object.

In this connection, for example FIG. 14A illustrates a grained floor covering 56 on the interior surface I and shows an image currently detectable by the camera provided on the interior object in a field of vision FOV of the camera. The field of vision FOV here defines an optical detection area for the detection device D, in order to infer a position of the interior object via a pattern of the floor covering 56—e.g. given by its grain.

Alternatively, as is likewise illustrated with reference to FIG. 14A, a mark can be incorporated in the pattern of the floor covering 56, which—when it is located in the field of vision FOV of the camera of the detection device D—can be evaluated as an indicator for a particular position on the interior surface I. For example, the mark therefor can be provided in the form of a locally limited change of the pattern of the floor covering 56, for example by a locally limited area in which grain lines are rotated by a certain angle. This may include the possibility that via differently strongly rotated mark areas distributed on the floor covering 56 different positions on the floor covering 56 are integrated in an optically detectable and electronically evaluable way.

Alternatively or additionally, a mark in the form of an artificially generated random pattern can be provided on the floor covering 56, which at any point is unique for the size of the field of vision VOF. This in particular includes the QR code already mentioned above.

In the design variant of FIG. 14B a local position coding is provided, in which at least one optical code is located within the field of vision FOV, which contains encrypted position information. This position information for example can be embedded in a dot matrix 650, which is provided at a point of a—possibly grained—floor covering 56. When the corresponding dot matrix 560 is located in the field of vision FOV of the camera of the detection device D, the dot matrix 560 is detected and the position information stored via the arrangement of the dots of the dot matrix 560 is evaluated. Via a plurality of dot matrices 560 distributed on the floor covering 56, position information each associated with the respective position of the dot matrix 560 thus can be encoded in optically readable form.

In principle, in a design variant corresponding to FIGS. 1 to 14B as explained above it can be provided that the electronic detection device D likewise is adapted and provided to detect a potential obstacle in an adjustment path of an interior object 1, 1a, 1b, 1c to be adjusted.

Upon detection of a potential obstacle, the electronic detection device D then can be used to output an acoustically, haptically and/or visually perceptible alarm signal and/or the drive motor 120 device can be actuatable for stopping and/or reversing an adjusting movement. In this way it is prevented for example in an electronically controlled way that an interior object 1, 1a, 1b, 1c on its way to an anchor point A, A1, A2 collides with another object, in particular a person or an item in the interior of the vehicle F, and/or that in the case of a subsequent change in position after the fixing position has been reached already, such as during a rotation of a vehicle seat 1 about the vertical corresponding to FIGS. 2B and 2C, the interior object collides with another object.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE NUMERALS 1, 1a, 1b, 1c vehicle seat (interior object)
10 backrest (adjustment part)
11 seat part (adjustment part)
12 base
120 drive motor
121 battery
122 connector
123 coupling portion
12A drive device
2.1, 2.2 omniwheel
20 roller support
21 roller
22A, 22B drive device
22.1, 22.2 wheel
220 pinion/drive motor
221 shaft
2210 magnet
222 Hall sensor
223 transmission 31 fixing bolt
32 fixing bolt
4, 4a tag (detection element)
4b coil
5.1-5.4, 5.5 sensor element
50 positioning disk (positioning aid)
51 searching wire
52 wire grid
520, 621 active wire (positioning aid)
522 inactive wire (positioning aid)
53 RFID grid
530 RFID tag (positioning aid)
54 illumination array
540 lighting element
540a, 540b light beam
55 perforated plate
56 floor covering
560 dot matrix (optical coding)
61 receiver unit
65 transmitter unit
A, A1, A2 anchor point (fixing position/positioning aid)
AE electronic evaluation unit
B width
D detection device
F vehicle
FL field lines
FOV field of vision/detection area
I interior surface
K camera
L length
LF loading sill
O fixing opening
R direction of displacement
R1, R2 direction of displacement
Z toothed rack (positioning aid)
Z1, Z2 tooth
ZR1, ZR2 gear wheel While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

The invention claimed is:

1. A vehicle provided with a vehicle interior including an interior surface, the vehicle comprising:
at least one interior object configured to be arranged and fixated in the vehicle interior; and
an electronic detection device configured to detect a position of the at least one interior object on the interior surface,
wherein the at least one interior object includes at least one drive device configured to non-mechanically guide and displace the interior object on the interior surface of the vehicle, and the electronic detection device is configured to detect when the interior object reaches a specified fixing position on the interior surface,
wherein the electronic detection device comprises a plurality of positioning aids in the vehicle interior, with the aid of which it is possible to electronically infer a current position of the interior object on the interior surface and whether the fixing position has been reached.

2. The vehicle of claim 1, wherein the electronic detection device is adapted to perform contactless detection of the interior object reaching the specified fixing position on the interior surface.

3. The vehicle of claim 1, wherein the electronic detection device is configured to perform contactless detection of the interior object reaching the specified fixing position optically, magnetically, in a sound-based way, based on radio waves, and/or based on a laser beam.

4. The vehicle of claim 1, wherein the electronic detection device is configured to perform contactless detection of the interior object as the interior object is displaced on the interior surface optically, magnetically, in a sound-based way, based on radio waves, and/or based on a laser beam.

5. The vehicle of claim 1, wherein the electronic detection device includes at least one component provided on the interior object, and/or at least one sensor element including an integrated electronic evaluation unit.

6. The vehicle of claim 5, wherein the at least one sensor element of the electronic detection device is configured to detect positions of the at least one component provided on the interior object.

7. The vehicle of claim 5, wherein the at least one component provided on the interior object is configured to detect at least one positioning aid of the plurality of positioning aids in order to determine a position of the interior object on the interior surface.

8. The vehicle of claim 7, wherein the at least one component provided on the interior surface includes a camera.

9. The vehicle of claim 7, wherein a positioning aid of the plurality of positioning aids includes at least one two-dimensional code.

10. The vehicle of claim 7, wherein at least one of the positioning aids of the plurality of positioning aids includes a searching wire disposed on the interior surface, wherein the searching wire includes a wire end ending at a fixing position.

11. The vehicle of claim 10, wherein the positioning aid and the searching wire are collectively mounted to be adjustable along the interior surface.

12. The vehicle of claim 7, wherein at least one positioning aid of the plurality of positioning aids forms a portion of a wire grid disposed on the interior surface.

13. The vehicle of claim 12, further comprising:
at least one coil disposed on the interior object and configured to generate an alternating magnetic field configured to induce a voltage to individual wires of the wire grid so that a position of the coil and the interior object is determined based on the voltage induced to the individual wires.

14. The vehicle of claim 7, wherein at least one positioning aid of the plurality of positioning aids includes an RFID tag disposed on the interior surface.

15. The vehicle of claim 14, wherein a plurality of RFID tags including the RFID tag are arranged in a grid and disposed on the interior surface, wherein readable data of each RFID tag of the plurality of RFID tags represent a unique position on the interior surface, wherein the electronic detection device includes an electronic evaluation unit and at least one RFID reader is disposed on the interior object and is coupled to the electronic evaluation unit, wherein the RFID reader is configured to read the readable data of at least one RFID tag of the plurality of RFID tags to determine a current position of the interior object.

16. The vehicle of claim 7, wherein one positioning aid of the plurality of positioning aids includes a line disposed on the interior surface, and at least one sensor element is disposed on the interior object, wherein the at least one sensor element is configured detect a course of the line.

17. The vehicle of claim 16, further comprising:
a light source; and
at least two phototransistors, wherein the light source is configured to emit light in a direction of the line, and the at least two phototransistors are configured to detect light reflected from the line to determine a position of the interior object.

18. The vehicle of claim 16, further comprising:
at least two Hall sensors disposed on the interior object, wherein the line is formed by a magnetic tape and the at least two Hall sensors are configured to detect the course of the line.

19. The vehicle of claim 1, wherein the plurality of positioning aids are positioned on the interior surface to form a grid.

20. The vehicle of claim 1, wherein at least one positioning aid of the plurality of positioning aids is configured to post-normalize a drift of a position calculated via an acceleration sensor and/or gyro sensor.

21. The vehicle of claim 1, wherein the electronic detection device includes two sensor elements each configured to operate based on different measurement principles to detect the interior object reaching the specified fixing position.

22. The vehicle of claim 21, wherein a first sensor element of the two sensor elements is configured to operate based on a first measurement principle to detect a position of the interior object within a first radius positioned about a specified fixing position, wherein a second sensor element of the two sensor elements is configured to operate based on a second measurement principle, different than the first measurement principle, to detect a position of the interior object within a second radius positioned about the specified fixing position, wherein the second radius is smaller than the first radius.

23. The vehicle of claim 1, wherein the interior object includes a vehicle seat and/or a console.

24. A method of operating a vehicle interior, the method comprising:
non-mechanically guiding and displacing an interior object on an interior surface of a vehicle; and
detecting, by an electronic detection device, the interior object reaching a fixing position on the interior surface, wherein the detecting is performed optically, magnetically, in a sound-based way, based on radio waves, and/or based on a laser beam, and
detecting, by the electronic detection device, presence or movement of an object within the vehicle interior and/or a person speaking in the vehicle interior, wherein the detecting is performed based on sound.

25. The method of claim 24, further comprising:
controlling, electronic detection device, a path of displacement of a non-mechanically guided displaceable interior object to the fixing position, wherein the controlling is performed optically, magnetically, in a sound-based way, based on radio waves, and/or on the basis of a laser beam.

26. A vehicle provided with a vehicle interior including an interior surface, the vehicle comprising:

at least one interior object configured to be arranged and fixated in the vehicle interior; and
an electronic detection device configured to detect a position of the at least one interior object on the interior surface,
wherein the at least one interior object includes at least one drive device configured to non-mechanically guide and displace the interior object on the interior surface of the vehicle, and the electronic detection device is configured to detect when the interior object reaches a specified fixing position on the interior surface,
wherein the electronic detection device includes a plurality of positioning aids, and
wherein at least one positioning aid of the plurality of positioning aids is configured to post-normalize a drift of a position calculated via an acceleration sensor and/or gyro sensor.

27. A vehicle provided with a vehicle interior including an interior surface, the vehicle comprising:
at least one interior object configured to be arranged and fixated in the vehicle interior; and
an electronic detection device configured to detect a position of the at least one interior object on the interior surface,
wherein the at least one interior object includes at least one drive device configured to non-mechanically guide and displace the interior object on the interior surface of the vehicle, and the electronic detection device is configured to detect when the interior object reaches a specified fixing position on the interior surface,
wherein the electronic detection device includes at least one component provided on the interior object, and/or at least one sensor element including an integrated electronic evaluation unit, and
wherein a positioning aid of the plurality of positioning aids includes at least one of
(a) a two-dimensional code,
(b) an RFID tag disposed on the interior surface, or
(c) a line disposed on the interior surface, and at least one sensor element is disposed on the interior object, wherein the at least one sensor element is configured detect a course of the line.

28. A vehicle provided with a vehicle interior including an interior surface, the vehicle comprising:
at least one interior object configured to be arranged and fixated in the vehicle interior; and
an electronic detection device configured to detect a position of the at least one interior object on the interior surface,
wherein the at least one interior object includes at least one drive device configured to non-mechanically guide and displace the interior object on the interior surface of the vehicle, and the electronic detection device is configured to detect when the interior object reaches a specified fixing position on the interior surface, and
wherein the electronic detection device includes two sensor elements each configured to operate based on different measurement principles to detect the interior object reaching the specified fixing position.

* * * * *